United States Patent
Toyoda

(10) Patent No.: US 11,005,384 B2
(45) Date of Patent: May 11, 2021

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventor: Masaru Toyoda, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/487,860

(22) PCT Filed: Apr. 3, 2017

(86) PCT No.: PCT/JP2017/013954
§ 371 (c)(1),
(2) Date: Aug. 22, 2019

(87) PCT Pub. No.: WO2018/185812
PCT Pub. Date: Oct. 11, 2018

(65) Prior Publication Data
US 2020/0067417 A1   Feb. 27, 2020

(51) Int. Cl.
*H02J 9/06* (2006.01)
*H02M 1/00* (2006.01)
*H02M 5/458* (2006.01)
*H02M 7/5387* (2007.01)

(52) U.S. Cl.
CPC .............. *H02M 5/4585* (2013.01); *H02J 9/06* (2013.01); *H02M 1/00* (2013.01);
(Continued)

(58) Field of Classification Search
CPC .. H02J 9/06; H02J 9/062; H02M 1/00; H02M 5/4585; H02M 7/53871; H02M 7/5395;
(Continued)

(56) References Cited

U.S. PATENT DOCUMENTS

2008/0218284 A1   9/2008  Chen et al.
2013/0229835 A1*  9/2013  Yamanaka ............ H02M 5/297
                                                                  363/37
(Continued)

FOREIGN PATENT DOCUMENTS

JP   2001-128462 A    5/2001
JP   2007-282443 A    10/2007
(Continued)

OTHER PUBLICATIONS

Office Action issued in Indian Patent Application No. 201917035131 with English translation, 5 pages.
(Continued)

*Primary Examiner* — Toan T Vu
(74) *Attorney, Agent, or Firm* — Oblon, McClelland, Maier & Neustadt, L.L.P.

(57) ABSTRACT

When a load current is larger than a predetermined value, a control device of an uninterruptible power supply device controls an inverter by gate signals having a relatively high frequency and having controlled pulse widths, and when the load current is smaller than the predetermined value, the control device controls the inverter by the gate signals having a relatively low frequency and having fixed pulse widths. Therefore, when a load is a light load, switching losses occurring in IGBTs of the inverter can be decreased.

7 Claims, 14 Drawing Sheets

(52) U.S. Cl.
CPC .............. *H02M 7/53871* (2013.01); *H02M 2001/0009* (2013.01); *H02M 2001/0054* (2013.01)

(58) Field of Classification Search
CPC . H02M 2001/0009; H02M 2001/0054; H02M 7/487
USPC .............................. 307/20; 363/27; 323/282
See application file for complete search history.

(56) References Cited

U.S. PATENT DOCUMENTS

| | | |
|---|---|---|
| 2015/0076906 A1 | 3/2015 | Tamegai et al. |
| 2017/0005592 A1 | 1/2017 | Yan et al. |

FOREIGN PATENT DOCUMENTS

| | | |
|---|---|---|
| JP | 2008-92734 A | 4/2008 |
| JP | 2015-23743 | 2/2015 |
| JP | 2015-57027 A | 3/2015 |
| TW | 201703416 A | 1/2017 |

OTHER PUBLICATIONS

International Search Report dated Jun. 20, 2017 in PCT/JP2017/013954 filed Apr. 3, 2017.

Taiwanese Office Action dated Mar. 6, 2018 in Taiwanese Application No. 106120706 (with computer-generated English translation), 6 pages \* cited by examiner

POWER CONVERSION DEVICE

TECHNICAL FIELD

The present invention relates to a power conversion device, and in particular to a power conversion device including an inversion unit configured to convert direct current (DC) power into alternating current (AC) power.

BACKGROUND ART

For example, Japanese Patent Laying-Open No. 2008-92734 (PTL 1) discloses a power conversion device including an inversion unit including a plurality of switching elements and configured to convert DC power into AC power having a commercial frequency, and a control device configured to generate a PWM (Pulse Width Modulation) signal which has a frequency fully higher than the commercial frequency and has a pulse width controlled based on an AC output voltage of the inversion unit. The plurality of switching elements are controlled based on the PWM signal.

CITATION LIST

Patent Literature

PTL 1: Japanese Patent Laying-Open No. 2008-92734

SUMMARY OF INVENTION

Technical Problem

However, a conventional power conversion device has a problem that a switching loss occurs each time a switching element is turned on and off, causing a reduction in the efficiency of the power conversion device.

Accordingly, a main object of the present invention is to provide a highly efficient power conversion device.

Solution to Problem

A power conversion device in accordance with the present invention includes an inversion unit including a plurality of first switching elements and configured to convert DC power into AC power having a commercial frequency and supply the AC power to a load, and a first controller configured to perform a mode selected from a first mode and a second mode, the first mode being a mode in which a first pulse signal sequence is generated, the first pulse signal sequence having a first frequency higher than the commercial frequency and having a pulse width controlled based on an AC output voltage of the inversion unit, the second mode being a mode in which a second pulse signal sequence is generated, the second pulse signal sequence having a second frequency between the commercial frequency and the first frequency and having a fixed pulse width. The plurality of first switching elements are controlled based on the first pulse signal sequence during the first mode, and controlled based on the second pulse signal sequence during the second mode.

Advantageous Effects of Invention

In the power conversion device in accordance with the present invention, the mode selected from the first mode and the second mode is performed, the first mode being a mode in which the first pulse signal sequence having the first frequency and having the controlled pulse width is generated, the second mode being a mode in which the second pulse signal sequence having the second frequency lower than the first frequency and having the fixed pulse width is generated. Therefore, by selecting the second mode when the load can be operated by the second pulse signal sequence, switching losses occurring in the plurality of switching elements can be decreased, achieving an improved efficiency of the power conversion device.

DESCRIPTION OF EMBODIMENTS

First Embodiment

Figure 1:
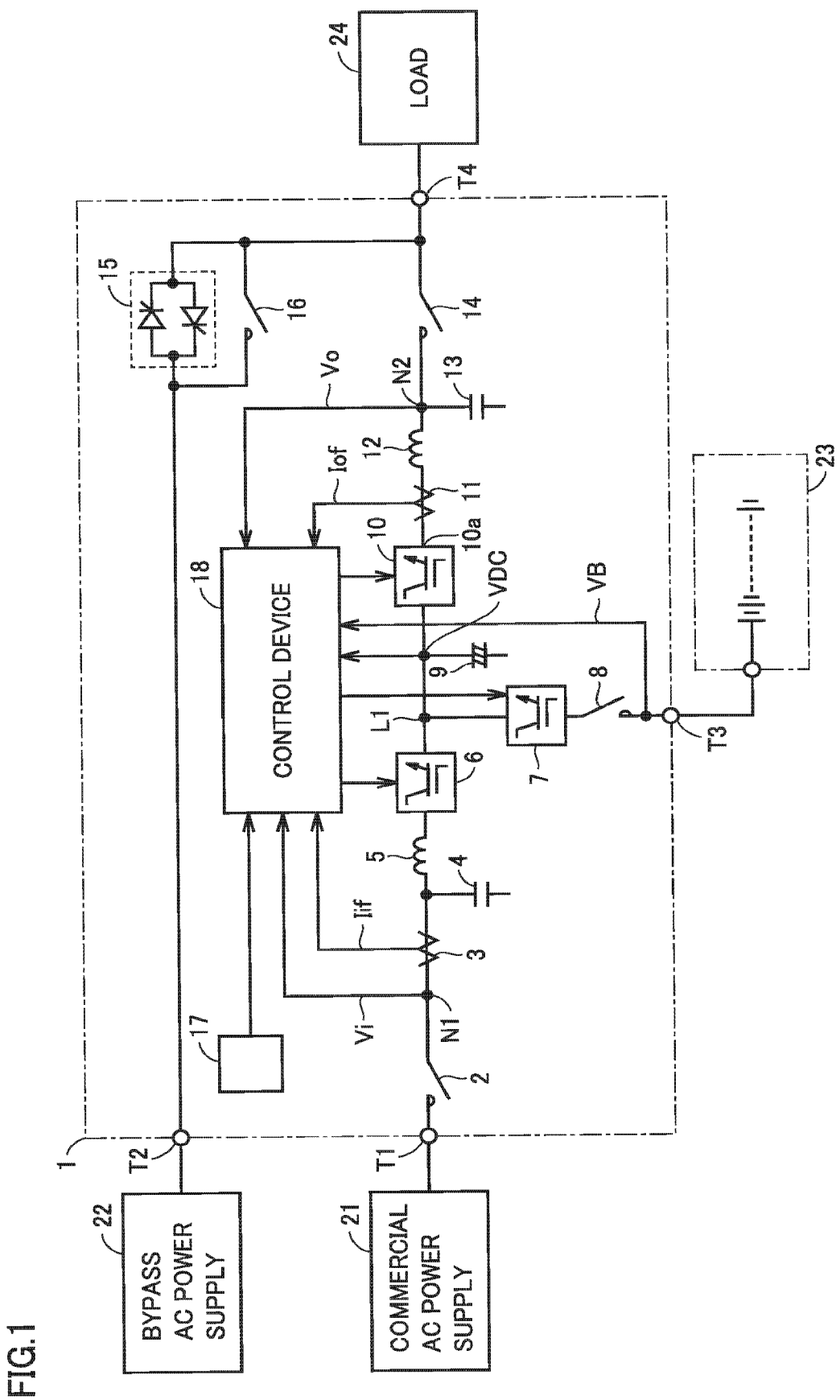
FIG. 1 is a circuit block diagram showing a configuration of an uninterruptible power supply device in accordance with a first embodiment of the present invention.

FIG. 1 is a circuit block diagram showing a configuration of an uninterruptible power supply device 1 in accordance with a first embodiment of the present invention. Uninterruptible power supply device 1 is configured to temporarily convert three-phase AC power from a commercial AC power supply 21 into DC power, convert the DC power into three-phase AC power, and supply the three-phase AC power to a load 24. For simplification of the drawing and the description, FIG. 1 shows only a circuit of a part corresponding to one phase (for example, U phase) of three phases (U phase, V phase, W phase).

In FIG. 1, uninterruptible power supply device 1 includes an AC input terminal T1, a bypass input terminal T2, a battery terminal T3, and an AC output terminal T4. AC input terminal T1 receives AC power having a commercial frequency from commercial AC power supply 21. Bypass input terminal T2 receives AC power having the commercial frequency from a bypass AC power supply 22. Bypass AC power supply 22 may be a commercial AC power supply, or may be a power generator.

Battery terminal T3 is connected to a battery (power storage device) 23. Battery 23 stores DC power. A capacitor may be connected instead of battery 23. AC output terminal T4 is connected to load 24. Load 24 is driven by AC power.

Uninterruptible power supply device 1 further includes electromagnetic contactors 2, 8, 14, and 16, current detectors 3 and 11, capacitors 4, 9, and 13, reactors 5 and 12, a converter 6, a bidirectional chopper 7, an inverter 10, a semiconductor switch 15, an operation unit 17, and a control device 18.

Electromagnetic contactor 2 and reactor 5 are connected in series between AC input terminal T1 and an input node of converter 6. Capacitor 4 is connected to a node N1 between electromagnetic contactor 2 and reactor 5. Electromagnetic contactor 2 is turned on during use of uninterruptible power supply device 1, and is turned off during maintenance of uninterruptible power supply device 1, for example.

An instantaneous value of an AC input voltage Vi appearing at node N1 is detected by control device 18. Whether or not a power failure has occurred and the like are determined based on the instantaneous value of AC input voltage Vi. Current detector 3 detects an AC input current Ii flowing to node N1, and provides a signal Iif indicating a detection value thereof to control device 18.

Capacitor 4 and reactor 5 constitute a low pass filter, which passes the AC power having the commercial frequency from commercial AC power supply 21 to converter 6, and prevents passage of a signal having a switching frequency generated in converter 6 to commercial AC power supply 21.

Converter 6 is controlled by control device 18. During a normal state in which the AC power is supplied from commercial AC power supply 21, converter 6 converts the AC power into DC power and outputs the DC power to a DC line L1. During a power failure in which the supply of the AC power from commercial AC power supply 21 is stopped, operation of converter 6 is stopped. An output voltage of converter 6 can be controlled to a desired value. Capacitor 4, reactor 5, and converter 6 constitute a conversion unit.

Capacitor 9 is connected to DC line L1 to smooth a voltage in DC line L1. An instantaneous value of a DC voltage VDC appearing in DC line L1 is detected by control device 18. DC line L1 is connected to a high voltage-side node of bidirectional chopper 7, and a low voltage-side node of bidirectional chopper 7 is connected to battery terminal T3 via electromagnetic contactor 8.

Electromagnetic contactor 8 is turned on during use of uninterruptible power supply device 1, and is turned off during maintenance of uninterruptible power supply device 1 and battery 23, for example. An instantaneous value of a voltage VB between terminals of battery 23 appearing at battery terminal T3 is detected by control device 18.

Bidirectional chopper 7 is controlled by control device 18. During a normal state in which the AC power is supplied from commercial AC power supply 21, bidirectional chopper 7 stores the DC power generated by converter 6 in battery 23. During a power failure in which the supply of the AC power from commercial AC power supply 21 is stopped, bidirectional chopper 7 supplies the DC power in battery 23 to inverter 10 via DC line L1.

When bidirectional chopper 7 stores the DC power in battery 23, bidirectional chopper 7 steps down DC voltage VDC in DC line L1 and provides it to battery 23. In addition, when bidirectional chopper 7 supplies the DC power in battery 23 to inverter 10, bidirectional chopper 7 boosts voltage VB between the terminals of battery 23 and outputs it to DC line L1. DC line L1 is connected to an input node of inverter 10.

Inverter 10 is controlled by control device 18, and converts the DC power supplied from converter 6 or bidirectional chopper 7 via DC line L1 into AC power having the commercial frequency and outputs the AC power. That is, during a normal state, inverter 10 converts the DC power supplied from converter 6 via DC line L1 into AC power, and during a power failure, inverter 10 converts the DC power supplied from battery 23 via bidirectional chopper 7 into AC power. An output voltage of inverter 10 can be controlled to a desired value.

An output node 10a of inverter 10 is connected to one terminal of reactor 12, and the other terminal of reactor 12 (a node N2) is connected to AC output terminal T4 via electromagnetic contactor 14. Capacitor 13 is connected to node N2.

Current detector 11 detects an instantaneous value of an output current Io of inverter 10, and provides a signal Iof indicating a detection value thereof to control device 18. An instantaneous value of an AC output voltage Vo appearing at node N2 is detected by control device 18.

Reactor 12 and capacitor 13 constitute a low pass filter, which passes the AC power having the commercial frequency generated in inverter 10 to AC output terminal T4, and prevents passage of a signal having a switching frequency generated in inverter 10 to AC output terminal T4. Inverter 10, reactor 12, and capacitor 13 constitute an inversion unit.

Electromagnetic contactor 14 is controlled by control device 18. Electromagnetic contactor 14 is turned on during an inverter power feeding mode in which the AC power generated by inverter 10 is fed to load 24, and is turned off during a bypass power feeding mode in which the AC power from bypass AC power supply 22 is fed to load 24.

Semiconductor switch 15 includes a thyristor, and is connected between bypass input terminal T2 and AC output terminal T4. Electromagnetic contactor 16 is connected in parallel with semiconductor switch 15. Semiconductor switch 15 is controlled by control device 18. Semiconductor switch 15 is usually turned off, and, when inverter 10 has a failure, semiconductor switch 15 is instantaneously turned on to supply the AC power from bypass AC power supply 22 to load 24. Semiconductor switch 15 is turned off after a predetermined time has elapsed since it was turned on.

Electromagnetic contactor 16 is turned off during the inverter power feeding mode in which the AC power generated by inverter 10 is fed to load 24, and is turned on during the bypass power feeding mode in which the AC power from bypass AC power supply 22 is fed to load 24.

In addition, when inverter 10 has a failure, electromagnetic contactor 16 is turned on to supply the AC power from bypass AC power supply 22 to load 24. That is, when inverter 10 has a failure, semiconductor switch 15 is instantaneously turned on only for the predetermined time, and electromagnetic contactor 16 is also turned on. This is to prevent semiconductor switch 15 from being overheated and damaged.

Operation unit 17 includes a plurality of buttons to be operated by a user of uninterruptible power supply device 1, an image display unit for displaying various pieces of information, and the like. By operating operation unit 17, the user can power on and off uninterruptible power supply device 1, and can select one of the bypass power feeding mode and the inverter power feeding mode.

Control device 18 controls entire uninterruptible power supply device 1 based on a signal from operation unit 17, AC input voltage Vi, AC input current Ii, DC voltage VDC, battery voltage VB, AC output current Io, AC output voltage Vo, and the like. That is, control device 18 detects whether or not a power failure has occurred based on a detection value of AC input voltage Vi, and controls converter 6 and inverter 10 in synchronization with the phase of AC input voltage Vi.

Further, during a normal state in which the AC power is supplied from commercial AC power supply 21, control device 18 controls converter 6 such that DC voltage VDC becomes equal to a desired target DC voltage VDCT, and during a power failure in which the supply of the AC power from commercial AC power supply 21 is stopped, control device 18 stops operation of converter 6.

Further, during a normal state, control device 18 controls bidirectional chopper 7 such that battery voltage VB becomes equal to a desired target battery voltage VBT, and during a power failure, control device 18 controls bidirectional chopper 7 such that DC voltage VDC becomes equal to desired target DC voltage VDCT.

Further, control device 18 determines whether or not a load current IL is smaller than a predetermined value Ic (that is, whether or not load 24 is a light load), based on output signal Iof of current detector 11. When load current IL is larger than predetermined value Ic, control device 18 selects a normal operation mode (a first mode), and when load current IL is smaller than predetermined value Ic, control device 18 selects a power saving operation mode (a second mode). Control device 18 performs the selected mode.

When control device 18 selects the normal operation mode, control device 18 compares levels of a sinusoidal signal having the commercial frequency and a triangular wave signal having a frequency fH fully higher than the commercial frequency, and generates a gate signal (a first pulse signal sequence) for controlling inverter 10 based on the result of comparison. In the normal operation mode, the gate signal is a pulse signal sequence which has a frequency with a value according to frequency fH of the triangular wave signal. The pulse width of the gate signal is controlled such that AC output voltage Vo reaches a reference voltage.

When control device 18 selects the power saving operation mode, control device 18 generates a gate signal (a second pulse signal sequence) having a frequency fL between the commercial frequency and frequency fH. In the power saving operation mode, the gate signal is a pulse signal sequence having frequency fL and having a fixed pulse width.

Figure 2:
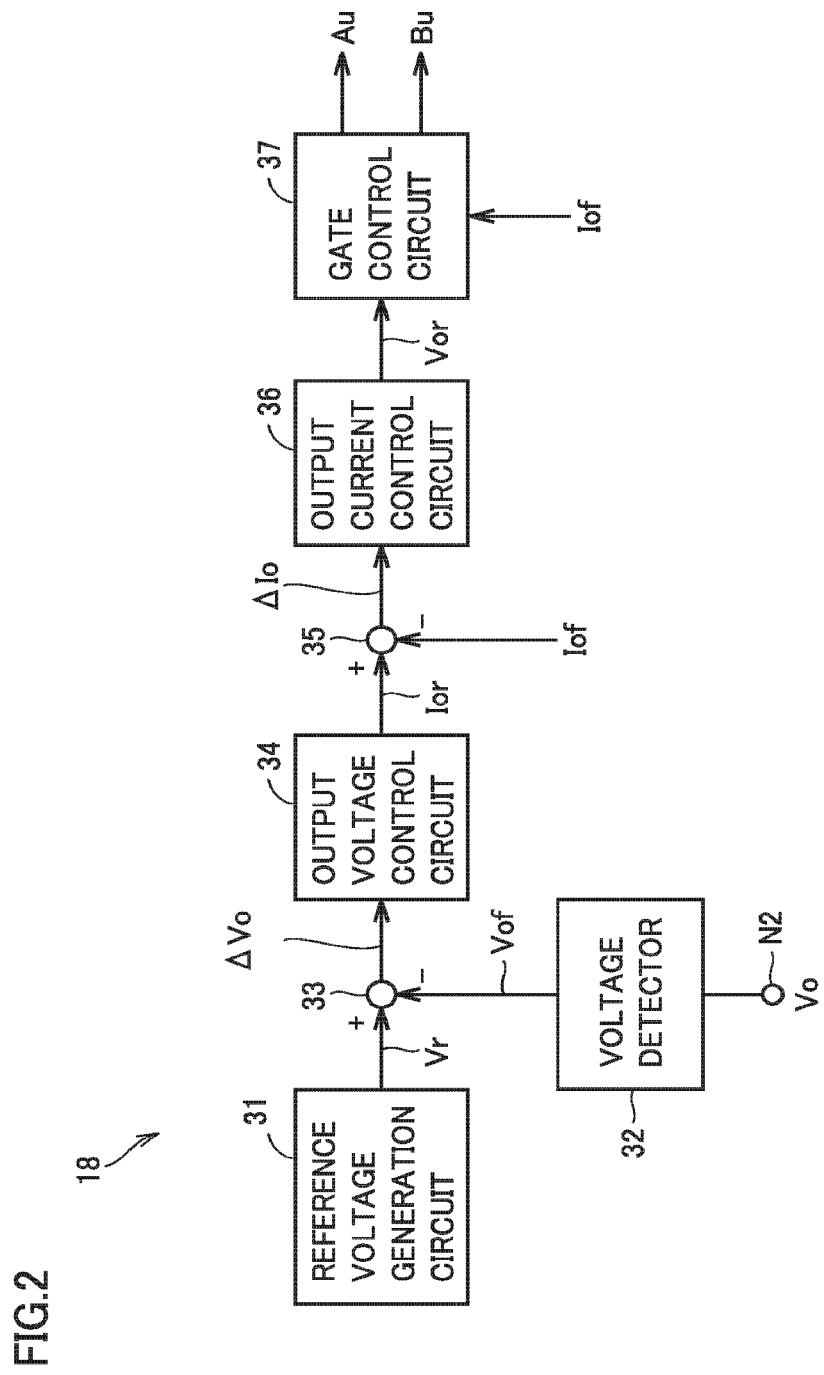
FIG. 2 is a block diagram showing a configuration of a part related to controlling an inverter, of a control device shown in FIG. 1.

FIG. 2 is a block diagram showing a configuration of a part related to controlling inverter 10, of the control device shown in FIG. 1. In FIG. 2, control device 18 includes a reference voltage generation circuit 31, a voltage detector 32, subtractors 33 and 35, an output voltage control circuit 34, an output current control circuit 36, and a gate control circuit 37.

Reference voltage generation circuit 31 generates a reference AC voltage Vr which is a sinusoidal signal having the commercial frequency. The phase of reference AC voltage Vr is in synchronization with the phase of AC input voltage Vi for a corresponding phase (here, U phase) of the three phases (U phase, V phase, W phase).

Voltage detector 32 detects the instantaneous value of AC output voltage Vo at node N2 (FIG. 1), and outputs a signal Vof indicating a detection value. Subtractor 33 obtains a deviation ΔVo between reference AC voltage Vr and output signal Vof of voltage detector 32.

Output voltage control circuit 34 adds a value proportional to deviation ΔVo to an integrated value of deviation ΔVo, to generate a current command value Ior. Subtractor 35 obtains a deviation ΔIo between current command value Ior and signal Iof from current detector 11. Output current control circuit 36 adds a value proportional to deviation ΔIo to an integrated value of deviation ΔIo, to generate a voltage command value Vor. Voltage command value Vor is a sinusoidal signal having the commercial frequency.

Gate control circuit 37 selects the normal operation mode or the power saving operation mode based on output signal Iof of current detector 11, and generates gate signals (pulse signal sequences) Au and Bu for controlling inverter 10 for the corresponding phase (here, U phase), according to the result of selection.

Figure 3:
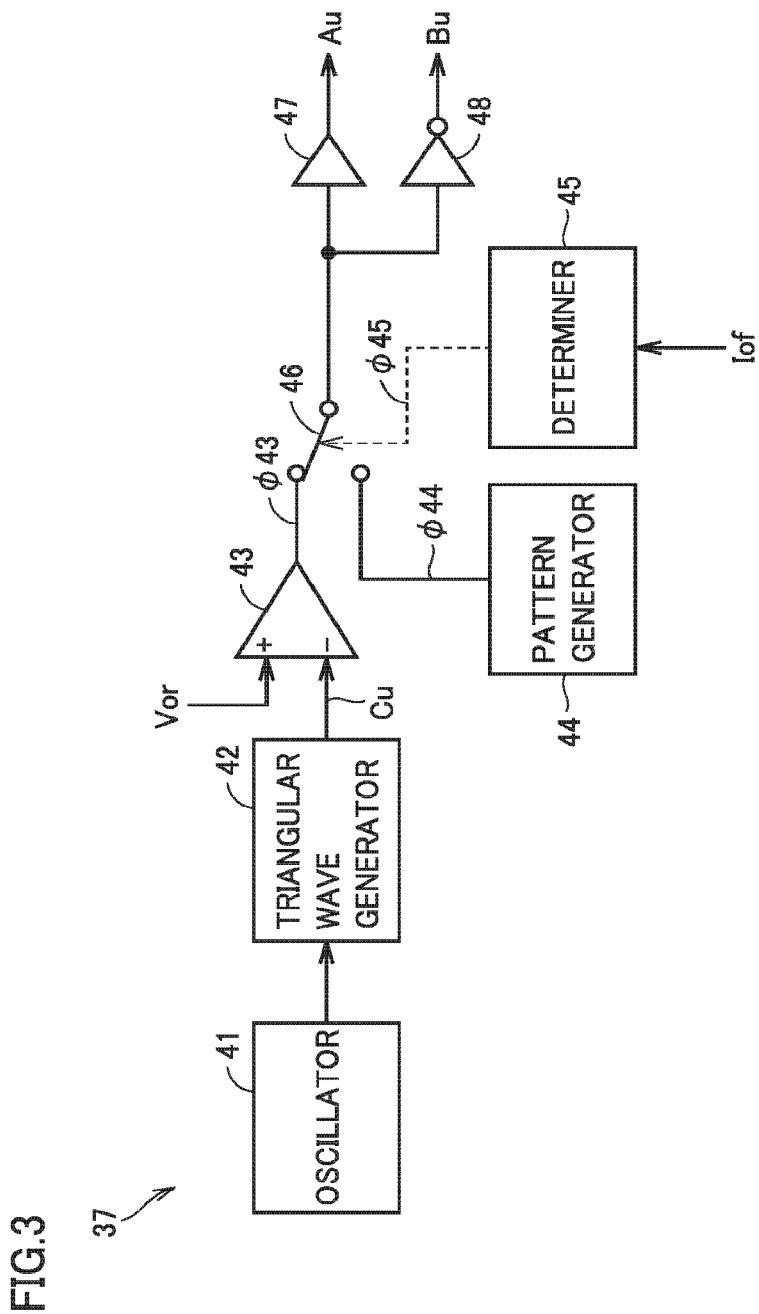
FIG. 3 is a circuit block diagram showing a configuration of a gate control circuit shown in FIG. 2.

FIG. 3 is a circuit block diagram showing a configuration of gate control circuit 37. In FIG. 3, gate control circuit 37 includes an oscillator 41, a triangular wave generator 42, a comparator 43, a pattern generator 44, a determiner 45, a switch 46, a buffer 47, and an inverter 48.

Oscillator 41 outputs a clock signal having frequency fH (for example, 20 KHz) fully higher than the commercial frequency (for example, 60 Hz). Triangular wave generator 42 outputs a triangular wave signal Cu having the same frequency as that of the output clock signal of the oscillator.

Comparator 43 compares levels of voltage command value Vor (a sinusoidal signal having the commercial frequency) from output current control circuit 36 (FIG. 2) and triangular wave signal Cu from triangular wave generator 42, and outputs a pulse signal sequence φ43 indicating the result of comparison. The frequency of pulse signal sequence φ43 has the same value as that of frequency fH of triangular wave signal Cu. The pulse width of pulse signal sequence φ43 changes according to the level of voltage command value Vor. Pulse signal sequence φ43 is a PWM signal.

Pattern generator 44 outputs a pulse signal sequence φ44 having frequency fL lower than frequency fH of triangular wave signal Cu. The waveform of pulse signal sequence φ44 is similar to the waveform of pulse signal sequence φ43. The pulse width of pulse signal sequence φ44 is fixed.

Determiner 45 determines whether or not load current IL is smaller than predetermined value Ic (that is, whether or not load 24 is a light load) based on signal Iof from current detector 11 (FIG. 1), and outputs a signal φ45 indicating the result of determination. Signal φ45 is set to an "L" level when load current IL is larger than predetermined value Ic, and is set to an "H" level when load current IL is smaller than predetermined value Ic.

Switch 46 receives pulse signal sequences φ43 and φ44. When signal φ45 is at the "L" level (i.e., in the normal operation mode), switch 46 provides pulse signal sequence φ43 to buffer 47 and inverter 48, and when signal φ45 is at the "H" level (i.e., in the power saving operation mode), switch 46 provides pulse signal sequence φ44 to buffer 47 and inverter 48.

Buffer 47 provides pulse signal sequence φ43 or φ44 from switch 46 to inverter 10, as gate signal Au. Inverter 48 inverts pulse signal sequence φ43 or φ44 from switch 46 to generate gate signal Bu and provides gate signal Bu to inverter 10.

Figure 4:
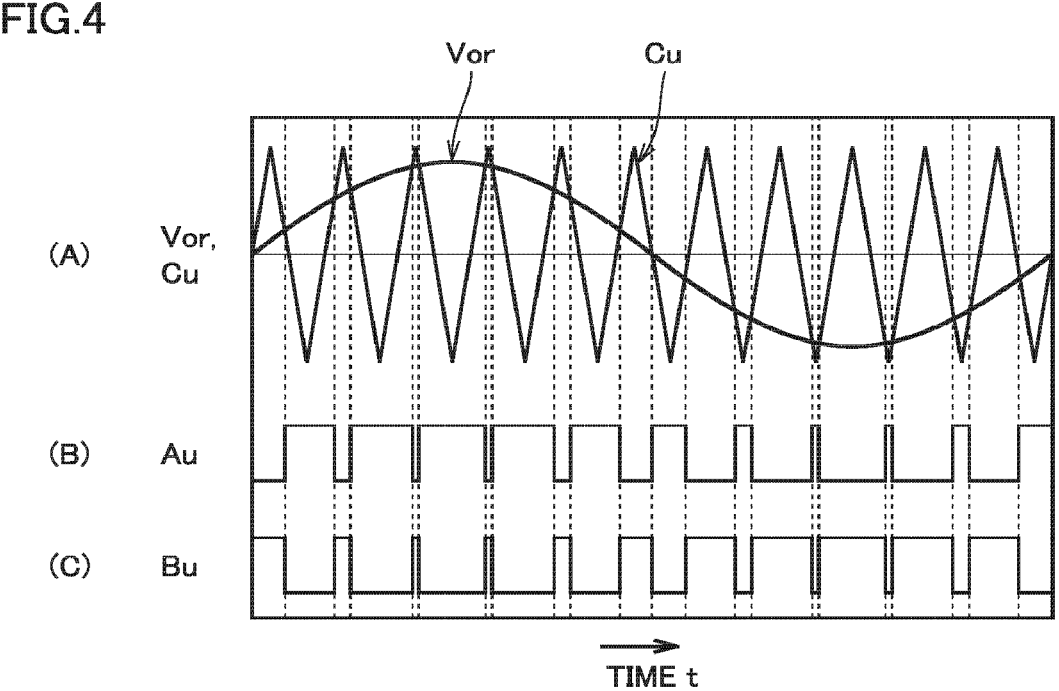
FIG. 4 is a time chart illustrating waveforms of a voltage command value, a triangular wave signal, and gate signals shown in FIG. 3.

FIGS. 4(A), (B), and (C) show a time chart showing waveforms of voltage command value Vor, triangular wave signal Cu, and gate signals Au and Bu during the normal operation mode. As shown in FIG. 4(A), voltage command value Vor is a sinusoidal signal having the commercial frequency. The frequency of triangular wave signal Cu is higher than the frequency (commercial frequency) of voltage command value Vor. A peak value of triangular wave signal Cu on the positive side is higher than a peak value of voltage command value Vor on the positive side. A peak value of triangular wave signal Cu on the negative side is lower than a peak value of voltage command value Vor on the negative side.

As shown in FIGS. 4(A) and (B), when the level of triangular wave signal Cu is higher than the level of voltage command value Vor, gate signal Au is at an "L" level, and when the level of triangular wave signal Cu is lower than the level of voltage command value Vor, gate signal Au is at an "H" level. Gate signal Au is a positive pulse signal sequence.

During a period in which voltage command value Vor has positive polarity, the pulse width of gate signal Au increases as voltage command value Vor increases. During a period in which voltage command value Vor has negative polarity, the pulse width of gate signal Au decreases as voltage command value Vor decreases. As shown in FIGS. 4(B) and (C), gate signal Bu is an inverted signal of gate signal Au. Each of gate signals Au and Bu is a PWM signal.

Waveforms of gate signals Au and Bu in the power saving operation mode are similar to the waveforms of gate signals Au and Bu in the normal operation mode. However, frequency fL of gate signals Au and Bu in the power saving operation mode is lower than frequency fH of gate signals Au and Bu in the normal operation mode. In addition, the pulse widths of gate signals Au and Bu are controlled in the normal operation mode, whereas the pulse widths of gate signals Au and Bu are fixed in the power saving operation mode.

Figure 5:
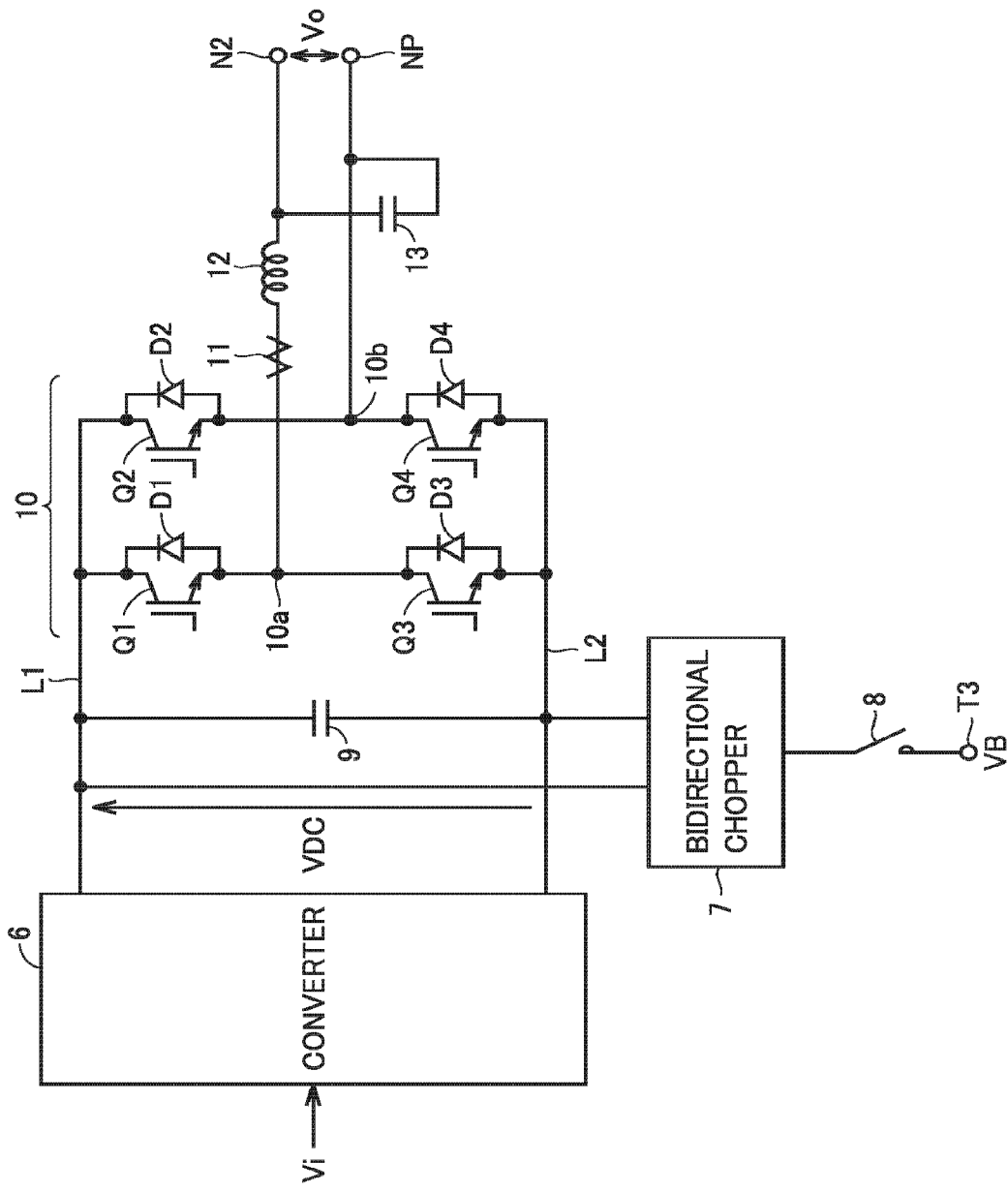
FIG. 5 is a circuit block diagram showing a configuration of the inverter and the periphery thereof shown in FIG. 1.

FIG. 5 is a circuit block diagram showing a configuration of inverter 10 and the periphery thereof shown in FIG. 1. In FIG. 5, positive-side DC line L1 and a negative-side DC line L2 are connected between converter 6 and inverter 10. Capacitor 9 is connected between DC lines L1 and L2.

During a normal state in which the AC power is supplied from commercial AC power supply 21, converter 6 converts AC input voltage Vi from commercial AC power supply 21 into DC voltage VDC and outputs DC voltage VDC to between DC lines L1 and L2. During a power failure in which the supply of the AC power from commercial AC power supply 21 is stopped, operation of converter 6 is stopped, and bidirectional chopper 7 boosts battery voltage VB and outputs DC voltage VDC to between DC lines L1 and L2.

Inverter 10 includes IGBTs (Insulated Gate Bipolar Transistors) Q1 to Q4 and diodes D1 to D4. An IGBT constitutes a switching element. IGBTs Q1 and Q2 have collectors connected to DC line L1, and emitters connected to output nodes 10a and 10b, respectively.

IGBTs Q3 and Q4 have collectors connected to output nodes 10a and 10b, respectively, and emitters connected to DC line L2. Gates of IGBTs Q1 and Q4 receive gate signal Au, and gates of IGBTs Q2 and Q3 receive gate signal Bu. Diodes D1 to D4 are connected in anti-parallel with IGBTs Q1 to Q4, respectively.

Inverter 10 has output node 10a connected to node N2 via reactor 12 (FIG. 1), and output node 10b connected to a neutral point NP. Capacitor 13 is connected between node N2 and neutral point NP.

When gate signals Au and Bu are at the "H" level and the "L" level, respectively, IGBTs Q1 and Q4 are turned on and IGBTs Q2 and Q3 are turned off. Thereby, a positive-side terminal of capacitor 9 (DC line L1) is connected to output node 10a via IGBT Q1, and output node 10b is connected to a negative-side terminal of capacitor 9 (DC line L2) via IGBT Q4, and thus a voltage between the terminals of capacitor 9 is output to between output nodes 10a and 10b. That is, a positive DC voltage is output to between output nodes 10a and 10b.

When gate signals Au and Bu are at the "L" level and the "H" level, respectively, IGBTs Q2 and Q3 are turned on and IGBTs Q1 and Q4 are turned off. Thereby, the positive-side terminal of capacitor 9 (DC line L1) is connected to output node 10b via IGBT Q2, and output node 10a is connected to the negative-side terminal of capacitor 9 (DC line L2) via IGBT Q3, and thus the voltage between the terminals of capacitor 9 is output to between output nodes 10b and 10a. That is, a negative DC voltage is output to between output nodes 10a and 10b.

When the waveforms of gate signals Au and Bu change as shown in FIGS. 4(B) and (C), AC output voltage Vo having the same waveform as that of voltage command value Vor shown in FIG. 4(A) is output to between node N2 and neutral point NP. It should be noted that, although FIGS. 4(A), (B), and (C) show the waveforms of voltage command value Vor and signals Cu, Au, and Bu corresponding to the U phase, the same applies to the waveforms of the voltage command value and the signals corresponding to each of the V phase and the W phase. However, the voltage command values and the signals corresponding to the U phase, the V phase, and the W phase are out of phase with respect to each other by 120 degrees.

As can be seen from FIGS. 4(A), (B), and (C), when the frequency of triangular wave signal Cu is increased, the frequency of gate signals Au and Bu increases, and the switching frequency of IGBTs Q1 to Q4 (the number of times of turning on and off per second) increases. When the switching frequency of IGBTs Q1 to Q4 increases, switching losses occurring in IGBTs Q1 to Q4 increase, causing a reduction in the efficiency of uninterruptible power supply device 1. However, when the switching frequency of IGBTs Q1 to Q4 is increased, high-quality AC output voltage Vo having a small voltage fluctuation rate can be generated even in a case where load current IL is large.

In contrast, when the frequency of triangular wave signal Cu is decreased, the frequency of gate signals Au and Bu decreases, and the switching frequency of IGBTs Q1 to Q4 decreases. When the switching frequency of IGBTs Q1 to Q4 decreases, switching losses occurring in IGBTs Q1 to Q4 decrease, achieving an improved efficiency of uninterruptible power supply device 1. However, when the switching frequency of IGBTs Q1 to Q4 is decreased, the voltage fluctuation rate of AC output voltage Vo increases and the waveform of AC output voltage Vo is deteriorated in the case where load current IL is large.

It should be noted that a voltage fluctuation rate of an AC voltage is indicated, for example, by a fluctuation range of the AC voltage on the basis of a rated voltage (100%). A voltage fluctuation rate of AC input voltage Vi supplied from commercial AC power supply 21 (FIG. 1) is ±10% on the basis of the rated voltage.

In a conventional uninterruptible power supply device, the frequency of triangular wave signal Cu is fixed to frequency fH (for example, 20 KHz) fully higher than the commercial frequency (for example, 60 Hz) to suppress a voltage fluctuation rate to a small value (±2%). Thus, load 24 having a small acceptable range for the voltage fluctuation rate (for example, a computer) can be driven. On the other hand, relatively large switching losses occur in IGBTs Q1 to Q4, causing a reduction in the efficiency of the uninterruptible power supply device.

However, in a case where load current IL is small, even when the switching frequency of IGBTs Q1 to Q4 is decreased, change of the voltage fluctuation rate of AC output voltage Vo is small, and the degree of deterioration of the waveform of AC output voltage Vo is small. In addition, when the switching frequency of IGBTs Q1 to Q4 is decreased, switching losses occurring in IGBTs Q1 to Q4 can be decreased, achieving an improved efficiency of uninterruptible power supply device 1. Further, in the case where load current IL is small, a change amount per unit time of load current IL is also small, and thus it is not necessary to perform PWM control.

Accordingly, in the first embodiment, there are provided the normal operation mode in which inverter 10 is controlled by gate signals Au and Bu having relatively high frequency fH and having controlled pulse widths, and the power saving operation mode in which inverter 10 is controlled by gate signals Au and Bu having relatively low frequency fL (for example, 15 KHz) and having fixed pulse widths to decrease switching losses.

When load current IL is larger than predetermined value Ic, the normal operation mode is selected, and when load current IL is smaller than predetermined value Ic, the power saving operation mode is selected. Frequency fL is set to a value at which the voltage fluctuation rate of AC output voltage Vo when load current IL is smaller than predetermined value Ic is less than or equal to the voltage fluctuation rate of AC input voltage Vi from commercial AC power supply 21.

Next, a method of using uninterruptible power supply device 1 and operation thereof will be described. It is assumed that the user of uninterruptible power supply device 1 operates operation unit 17 to select the inverter power feeding mode. When the inverter power feeding mode is selected during a normal state in which the AC power is supplied from commercial AC power supply 21, semiconductor switch 15 and electromagnetic contactor 16 are turned off, and electromagnetic contactors 2, 8, and 14 are turned on.

The AC power supplied from commercial AC power supply 21 is converted into DC power by converter 6. The DC power generated by converter 6 is stored in battery 23 by bidirectional chopper 7, and is also supplied to inverter 10.

In control device 18 (FIG. 2), sinusoidal reference AC voltage Vr is generated by reference voltage generation circuit 31, and signal Vof indicating the detection value of AC output voltage Vo is generated by voltage detector 32. Deviation ΔVo between reference AC voltage Vr and signal Vof is generated in subtractor 33, and current command value Ior is generated by output voltage control circuit 34 based on deviation ΔVo.

Deviation ΔIo between current command value Ior and signal Iof from current detector 11 (FIG. 1) is generated by subtractor 35, and voltage command value Vor is generated by output current control circuit 36 based on deviation ΔIo.

In gate control circuit 37 (FIG. 3), triangular wave signal Cu having relatively high frequency fH is generated by oscillator 41 and triangular wave generator 42. Voltage command value Vor is compared with triangular wave signal Cu by comparator 43, and pulse signal sequence φ43 is generated. In pattern generator 44, pulse signal sequence φ44 is generated. Pulse signal sequence φ43 or pulse signal sequence φ44 is selected by switch 46 and is provided to buffer 47 and inverter 48, and gate signals Au and Bu are generated by buffer 47 and inverter 48.

In inverter 10 (FIG. 5), IGBTs Q1 and Q4 and IGBTs Q2 and Q3 are alternately turned on by gate signals Au and Bu, and DC voltage VDC is converted into AC output voltage Vo having the commercial frequency.

When load 24 is driven by AC output voltage Vo, in determiner 45 (FIG. 3), it is determined whether or not load current IL is larger than predetermined value Ic, based on output signal Iof of current detector 11. When load current IL is larger than predetermined value Ic, output signal φ45 of determiner 45 is set to the "L" level, pulse signal sequence φ43 generated in comparator 43 is provided to buffer 47 and inverter 48 via switch 46, and the normal operation mode is performed.

Since each of IGBTs Q1 to Q4 is turned on and off at relatively high frequency fH in the normal operation mode, high-quality AC output voltage Vo having a small voltage fluctuation rate can be generated. However, switching losses occurring in IGBTs Q1 to Q4 increase, causing a reduction in efficiency.

In addition, when load current IL is smaller than predetermined value Ic, output signal φ45 of determiner 45 is set to the "H" level, pulse signal sequence φ44 generated in pattern generator 44 is provided to buffer 47 and inverter 48 via switch 46, and the power saving operation mode is performed.

In the power saving operation mode, each of IGBTs Q1 to Q4 is turned on and off at relatively low frequency fL, and PWM control is not performed. However, since load 24 is a light load, the voltage fluctuation rate of AC output voltage Vo is suppressed within an acceptable range. In addition, since the switching frequency decreases, switching losses occurring in IGBTs Q1 to Q4 decrease, achieving an improved efficiency.

It should be noted that, when the supply of the AC power from commercial AC power supply 21 is stopped, that is, when a power failure occurs, operation of converter 6 is stopped, and the DC power in battery 23 (FIG. 1) is supplied to inverter 10 by bidirectional chopper 7. Inverter 10 converts the DC power from bidirectional chopper 7 into AC power, and supplies the AC power to load 24. Therefore, operation of load 24 can be continued for a period in which the DC power is stored in battery 23.

In addition, when inverter 10 has a failure during the inverter power feeding mode, semiconductor switch 15 (FIG. 1) is instantaneously turned on, electromagnetic contactor 14 is turned off, and electromagnetic contactor 16 is turned on. Thereby, the AC power from bypass AC power supply 22 is supplied to load 24 via semiconductor switch 15 and electromagnetic contactor 16, and operation of load 24 is continued. Semiconductor switch 15 is turned off after the predetermined time to prevent semiconductor switch 15 from being overheated and damaged.

As described above, in the first embodiment, when load current IL is larger than predetermined value Ic, inverter 10 is controlled by gate signals Au and Bu having relatively high frequency fH and having controlled pulse widths, and when load current IL is smaller than predetermined value Ic, inverter 10 is controlled by gate signals Au and Bu have relatively low frequency fL and having fixed pulse widths. Therefore, when load current IL is smaller than predetermined value Ic, switching losses occurring in IGBTs Q1 to Q4 of inverter 10 can be decreased, achieving an improved efficiency of uninterruptible power supply device 1.

Second Embodiment

Figure 6:
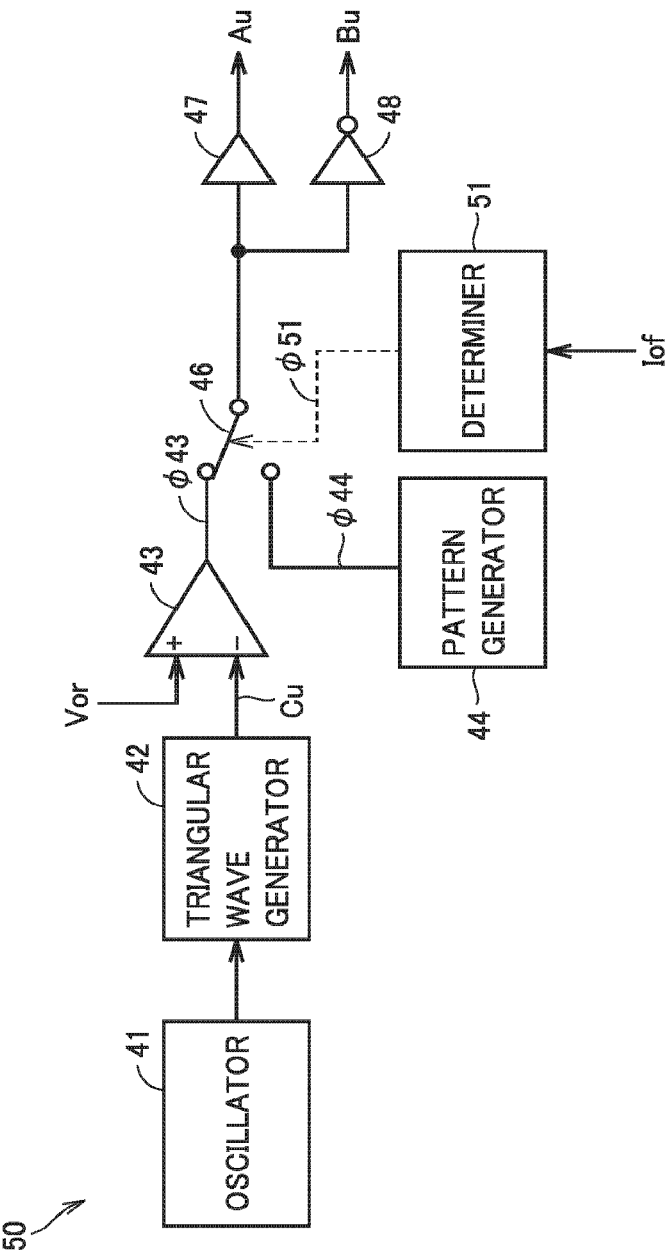
FIG. 6 is a circuit block diagram showing a configuration of a gate control circuit of an uninterruptible power supply device in accordance with a second embodiment of the present invention.

FIG. 6 is a circuit block diagram showing a configuration of a gate control circuit 50 of an uninterruptible power supply device in accordance with a second embodiment of the present invention, which is compared with FIG. 3. In FIG. 6, gate control circuit 50 is configured by including a determiner 51 which replaces determiner 45 (FIG. 3) of gate control circuit 37.

Determiner 51 determines whether or not load current IL is constant based on output signal Iof of current detector 11, and outputs a signal φ51 indicating the result of determination. For example, when a change amount ΔIL per unit time of load current IL is larger than a predetermined value ILc, determiner 51 determines that load current IL is not constant, and sets signal φ51 to an "L" level. When change amount ΔIL is smaller than predetermined value ILc, determiner 51 determines that load current IL is constant, and sets signal φ51 to an "H" level.

When signal φ51 is at the "L" level, pulse signal sequence φ43 from comparator 43 is provided to buffer 47 and inverter 48 via switch 46, and the normal operation mode is performed. When signal φ51 is at the "H" level, pulse signal sequence φ44 from pattern generator 44 is provided to buffer 47 and inverter 48 via switch 46, and the power saving operation mode is performed. Since other configuration and operation are the same as those in the first embodiment, the description thereof will not be repeated.

In the second embodiment, when load current IL is not constant, inverter 10 is controlled by gate signals Au and Bu having relatively high frequency fH and having controlled pulse widths, and when load current IL is constant, inverter 10 is controlled by gate signals Au and Bu having relatively low frequency fL and having fixed pulse widths. Therefore, when load current IL is constant, switching losses occurring in IGBTs Q1 to Q4 of inverter 10 can be decreased, achieving an improved efficiency of uninterruptible power supply device 1.

Third Embodiment

Figure 7:
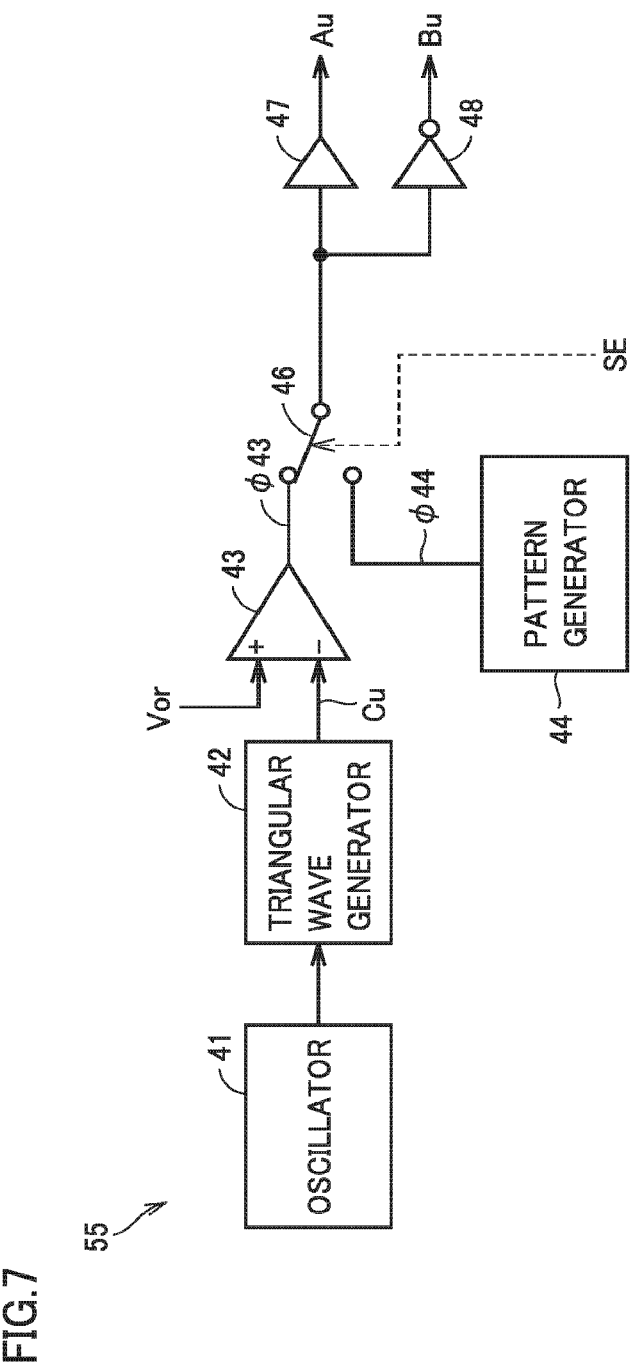
FIG. 7 is a circuit block diagram showing a configuration of a gate control circuit of an uninterruptible power supply device in accordance with a third embodiment of the present invention.

FIG. 7 is a circuit block diagram showing a configuration of a gate control circuit 55 of an uninterruptible power supply device in accordance with a third embodiment of the present invention, which is compared with FIG. 3. In FIG. 7, gate control circuit 55 is configured by removing determiner 45 (FIG. 3) from gate control circuit 37. Switch 46 is controlled by a signal SE from operation unit 17 (FIG. 1).

When the user of the uninterruptible power supply device knows beforehand that load 24 is not a light load and wants to select the normal operation mode, the user operates operation unit 17 to set signal SE to an "L" level. In addition, when the user of the uninterruptible power supply device knows beforehand that load 24 is a light load and wants to select the power saving operation mode, the user operates operation unit 17 to set signal SE to an "H" level.

When signal SE is at the "L" level, pulse signal sequence φ43 from comparator 43 is provided to buffer 47 and inverter 48 via switch 46, and the normal operation mode is performed. When signal SE is at the "H" level, pulse signal sequence φ44 from pattern generator 44 is provided to buffer 47 and inverter 48 via switch 46, and the power saving operation mode is performed. Since other configuration and operation are the same as those in the first embodiment, the description thereof will not be repeated.

In the third embodiment, by operating operation unit 17, a desired mode can be selected from the normal operation mode and the power saving operation mode. Therefore, by selecting the power saving operation mode when it is known beforehand that load 24 is a light load or that load current IL is constant, switching losses occurring in IGBTs Q1 to Q4 of inverter 10 can be decreased, achieving an improved efficiency of uninterruptible power supply device 1.

Figure 8:
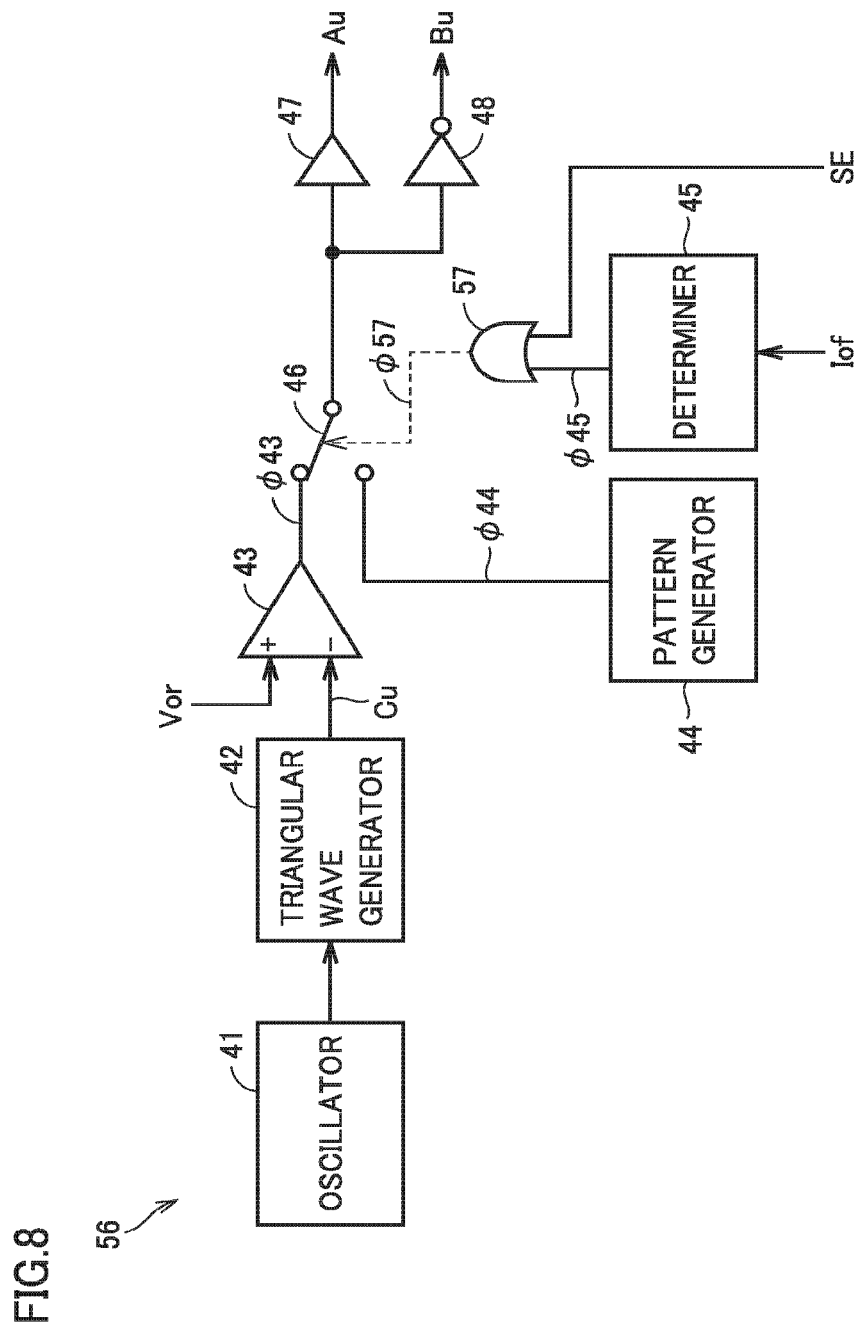
FIG. 8 is a circuit block diagram showing a configuration of a gate control circuit of an uninterruptible power supply device in accordance with a modification of the third embodiment.

FIG. 8 is a circuit block diagram showing a configuration of a gate control circuit 56 of an uninterruptible power supply device in accordance with a modification of the third embodiment, which is compared with FIG. 7. In FIG. 8, gate control circuit 56 is configured by adding determiner 45 (FIG. 3) and an OR gate 57 to gate control circuit 55. OR gate 57 outputs a logical sum signal φ57 indicating a logical sum of output signal φ45 of determiner 45 and signal SE from operation unit 17 (FIG. 1).

When the user of the uninterruptible power supply device knows beforehand that load 24 is a light load or that load current IL is constant, and wants to select the power saving operation mode, the user operates operation unit 17 to set signal SE to the "H" level. In addition, when the user of the uninterruptible power supply device does not know beforehand whether or not load 24 is a light load or whether or not load current IL is constant, the user operates operation unit 17 to set signal SE to the "L" level.

When signal SE is set to the "H" level, signal φ57 is set to an "H" level irrespective of output signal φ45 of determiner 45, and the power saving operation mode is performed. When signal SE is set to the "L" level, output signal φ45 of determiner 45 serves as signal φ57.

When signal φ57 is at an "L" level, pulse signal sequence φ43 from comparator 43 is provided to buffer 47 and inverter 48 via switch 46, and the normal operation mode is performed. When signal φ57 is at the "H" level, pulse signal sequence φ44 from pattern generator 44 is provided to buffer 47 and inverter 48 via switch 46, and the power saving operation mode is performed. Since other configuration and operation are the same as those in the first embodiment, the description thereof will not be repeated.

In this modification, the same effect as that of the third embodiment is obtained. In addition, by setting signal SE to the "L" level when it is not known beforehand whether or not load 24 is a light load, the power saving operation mode or the normal operation mode can be performed based on the result of determination by determiner 45.

Further, determiner 51 (FIG. 6) may be provided instead of determiner 45. Further, two determiners 45 and 51 may be provided, and switch 46 may be controlled by a logical sum signal indicating a logical sum of the output signals of two determiners 45 and 51 and signal SE.

Fourth Embodiment

In the first embodiment, the efficiency of uninterruptible power supply device 1 is improved by performing the power saving operation mode in which gate signals Au and Bu having relatively low frequency fL and having fixed pulse widths are generated, when load current IL is smaller than predetermined value Ic (that is, when load 24 is a light load).

However, since PWM control is not performed in the power saving operation mode in the first embodiment, AC output voltage Vo may be lower than reference AC voltage Vr (a rated voltage), depending on load 24. A fourth embodiment intends to solve this problem.

Figure 9:
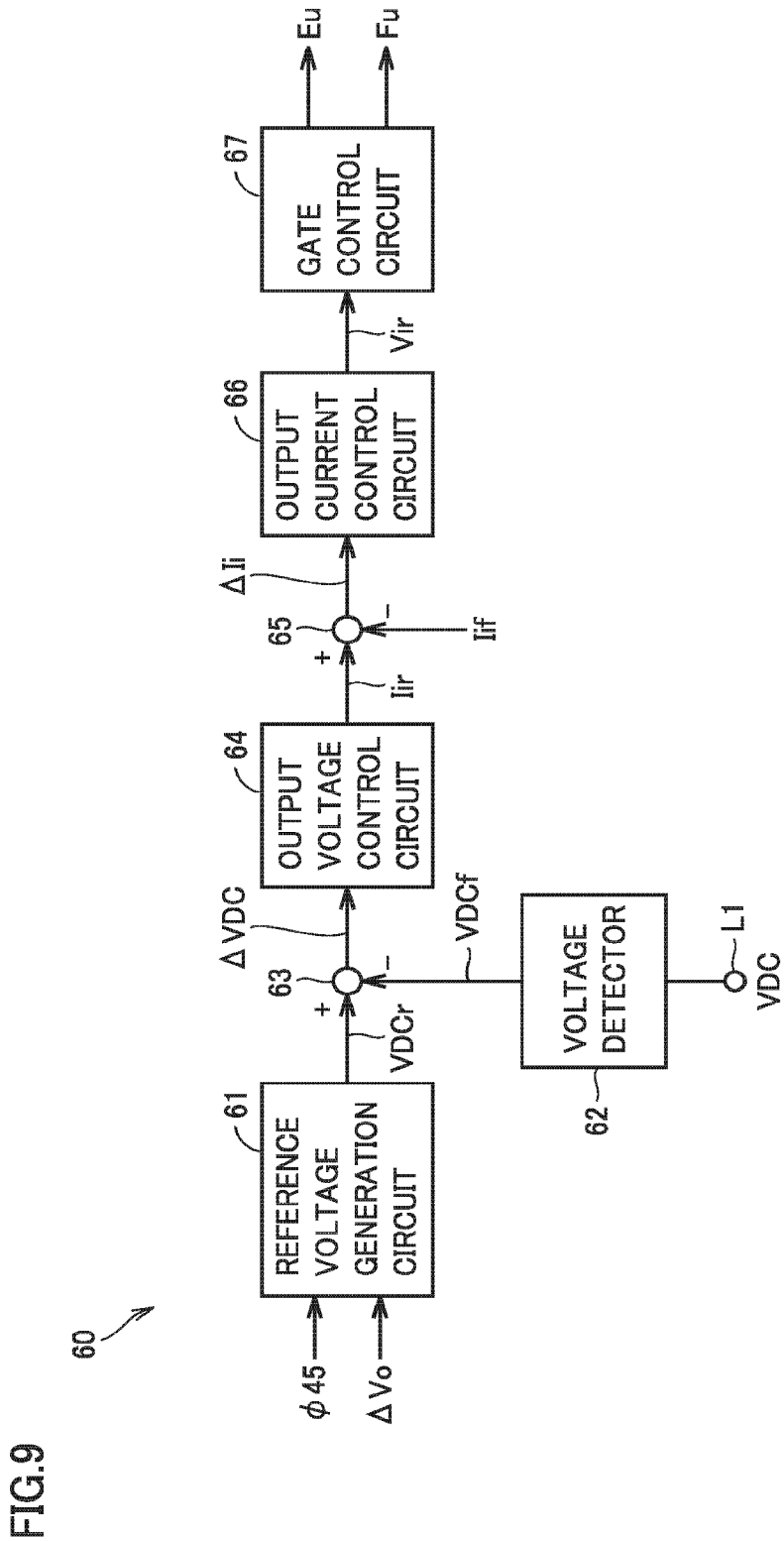
FIG. 9 is a circuit block diagram showing a main part of an uninterruptible power supply device in accordance with a fourth embodiment of the present invention.

FIG. 9 is a circuit block diagram showing a configuration of a part related to controlling converter 6, of a control device 60 included in an uninterruptible power supply device in accordance with the fourth embodiment of the present invention. A configuration of a part related to controlling inverter 10, of control device 60, is as shown in the first embodiment. In FIG. 9, control device 60 includes a reference voltage generation circuit 61, a voltage detector 62, subtractors 63 and 65, an output voltage control circuit 64, an output current control circuit 66, and a gate control circuit 67.

When output signal φ45 of determiner 45 (FIG. 3) is at the "L" level (i.e., in the normal operation mode), reference voltage generation circuit 61 sets a reference DC voltage VDCr to a rated voltage of DC voltage VDC. In addition, when output signal φ45 is at the "H" level (i.e., in the power saving operation mode), reference voltage generation circuit 61 corrects reference DC voltage VDCr according to deviation ΔVo from subtractor 33 (FIG. 2). On this occasion, reference voltage generation circuit 61 increases reference DC voltage VDCr in proportion to deviation ΔVo, for example.

Voltage detector 62 detects DC voltage VDC between DC lines L1 and L2, and outputs a signal VDCf indicating a detection value. Subtractor 63 obtains a deviation ΔVDC between reference DC voltage VDCr and output signal VDCf of voltage detector 62.

Output voltage control circuit 64 adds a value proportional to deviation ΔVDC to an integrated value of deviation ΔVDC, to generate a current command value Iir. Subtractor 65 obtains a deviation ΔIi between current command value Iir and signal Iif from current detector 3 (FIG. 1).

Output current control circuit 66 adds a value proportional to deviation ΔIi to an integrated value of deviation ΔIi, to generate a voltage command value Vir. Voltage command value Vir is a sinusoidal signal having the commercial frequency. Gate control circuit 67 generates gate signals (pulse signal sequences) Eu and Fu for controlling converter 6 for the corresponding phase (here, U phase), based on voltage command value Vir.

Figure 10:
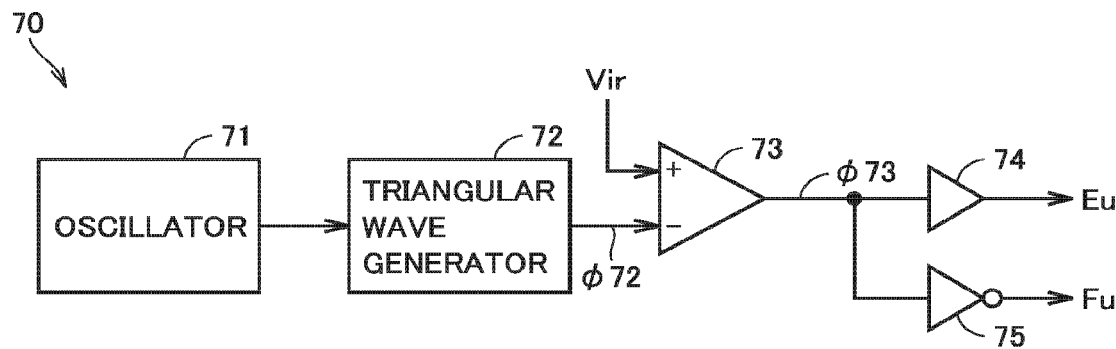
FIG. 10 is a circuit block diagram showing a configuration of a gate control circuit shown in FIG. 9.

FIG. 10 is a circuit block diagram showing a configuration of a gate control circuit 70. In FIG. 10, gate control circuit 70 includes an oscillator 71, a triangular wave generator 72, a comparator 73, a buffer 74, and an inverter 75.

Oscillator 71 outputs a clock signal having frequency fH (for example, 20 KHz) fully higher than the commercial frequency (for example, 60 Hz). Triangular wave generator 72 outputs a triangular wave signal φ72 having the same frequency as that of the output clock signal of the oscillator.

Comparator 73 compares levels of voltage command value Vir (a sinusoidal signal having the commercial frequency) from output current control circuit 66 (FIG. 9) and triangular wave signal φ72 from triangular wave generator 72, and outputs a pulse signal sequence φ73 indicating the result of comparison. The frequency of pulse signal sequence φ73 has the same value as that of frequency fH of triangular wave signal φ72. The pulse width of pulse signal sequence φ73 changes according to the level of voltage command value Vir. Pulse signal sequence φ73 is a PWM signal.

Buffer 74 provides pulse signal sequence φ73 to converter 6, as gate signal Eu. Inverter 75 inverts pulse signal sequence φ73 to generate gate signal Fu and provides gate signal Fu to converter 6.

Figure 11:
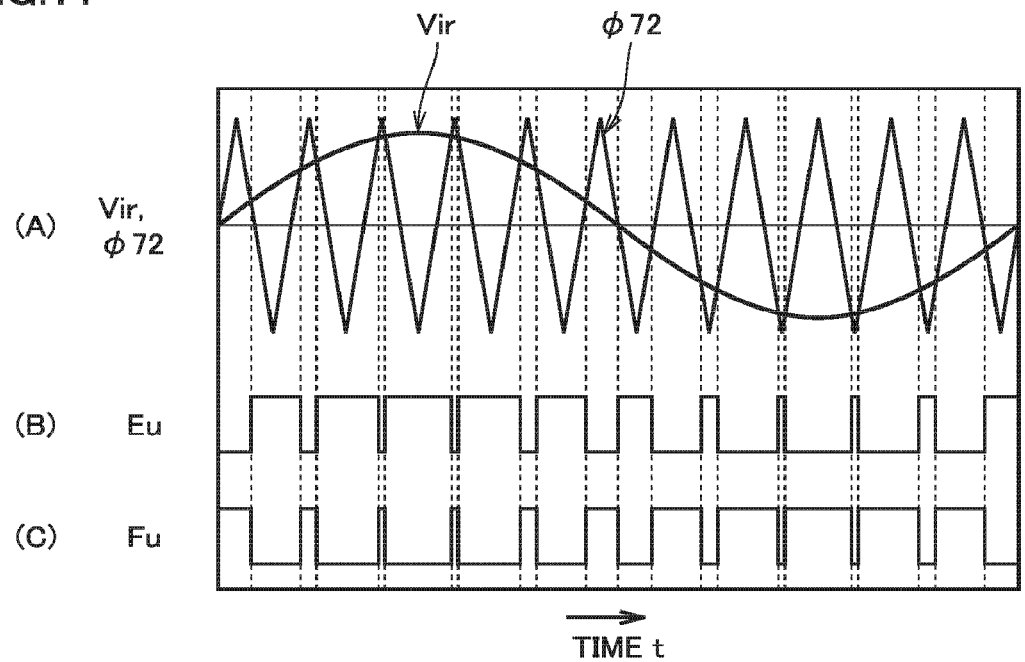
FIG. 11 is a time chart illustrating waveforms of a voltage command value, a triangular wave signal, and gate signals shown in FIG. 10.

FIGS. 11(A), (B), and (C) show a time chart showing waveforms of voltage command value Vir, triangular wave signal φ72, and gate signals Eu and Fu shown in FIG. 10. As shown in FIG. 11(A), voltage command value Vir is a sinusoidal signal having the commercial frequency. The frequency of triangular wave signal φ72 is higher than the frequency (commercial frequency) of voltage command value Vir. A peak value of triangular wave signal φ72 on the positive side is higher than a peak value of voltage command value Vir on the positive side. A peak value of triangular wave signal φ72 on the negative side is lower than a peak value of voltage command value Vir on the negative side.

As shown in FIGS. 11(A) and (B), when the level of triangular wave signal φ72 is higher than the level of voltage command value Vir, gate signal Eu is at an "L" level, and when the level of triangular wave signal φ72 is lower than the level of voltage command value Vir, gate signal Eu is at an "H" level. Gate signal Eu is a positive pulse signal sequence.

During a period in which voltage command value Vir has positive polarity, the pulse width of gate signal Eu increases as voltage command value Vir increases. During a period in which voltage command value Vir has negative polarity, the pulse width of gate signal Eu decreases as voltage command value Vir decreases. As shown in FIGS. 11(B) and (C), gate signal Fu is an inverted signal of gate signal Eu. Each of gate signals Eu and Fu is a PWM signal. Waveforms of gate signals Eu and Fu during the power saving operation mode are similar to waveforms of gate signals Eu and Fu during the normal operation mode.

Figure 12:
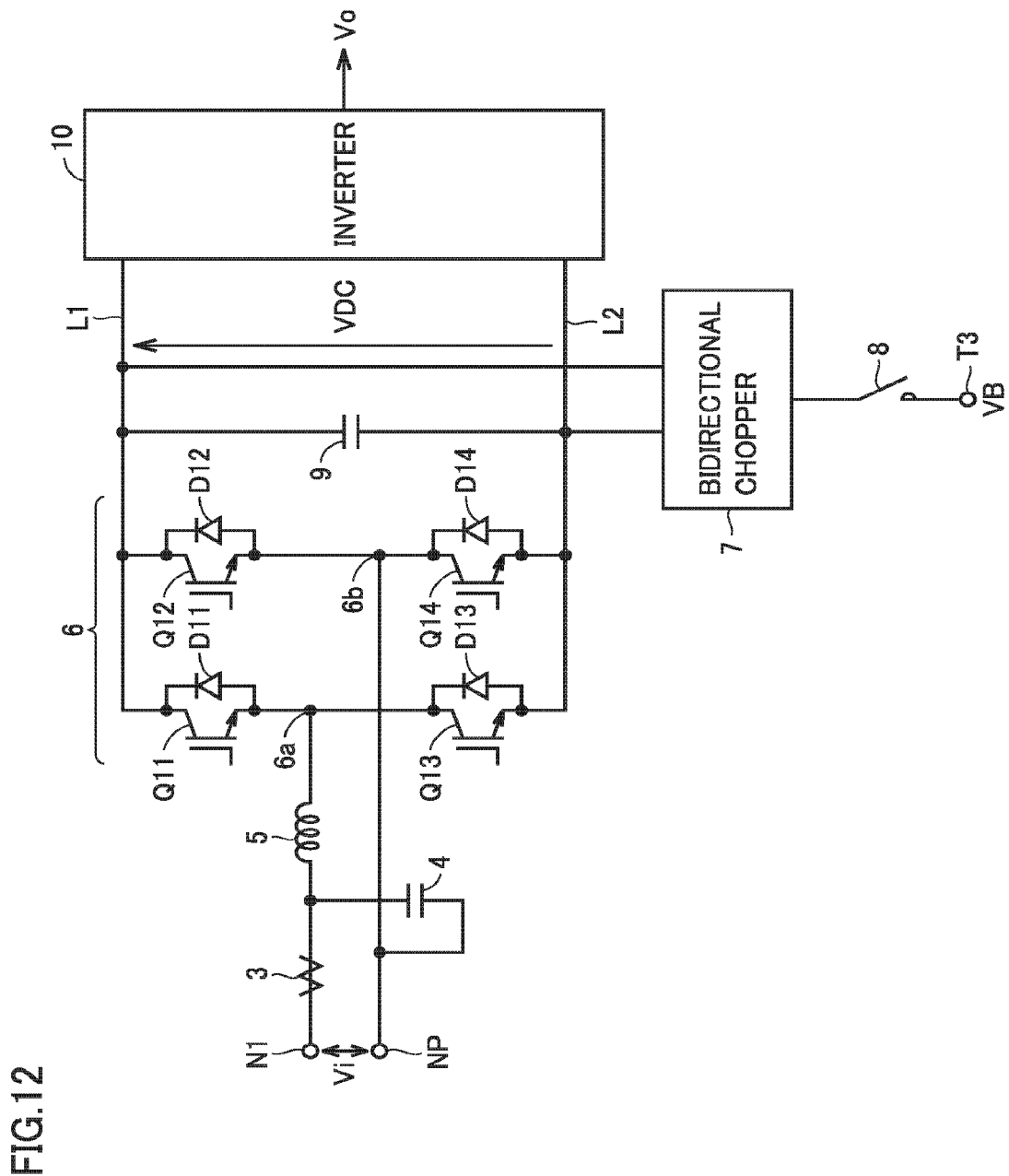
FIG. 12 is a circuit block diagram showing a configuration of a converter and the periphery thereof of the uninterruptible power supply device illustrated in FIG. 9.

FIG. 12 is a circuit block diagram showing a configuration of converter 6 and the periphery thereof shown in FIG. 1. In FIG. 12, positive-side DC line L1 and negative-side DC line L2 are connected between converter 6 and inverter 10. Capacitor 9 is connected between DC lines L1 and L2.

During a normal state in which the AC power is supplied from commercial AC power supply 21, converter 6 converts AC input voltage Vi from commercial AC power supply 21 into DC voltage VDC and outputs DC voltage VDC to between DC lines L1 and L2. During a power failure in which the supply of the AC power from commercial AC power supply 21 is stopped, operation of converter 6 is stopped, and bidirectional chopper 7 boosts battery voltage VB and outputs DC voltage VDC to between DC lines L1 and L2.

Converter 6 includes IGBTs Q11 to Q14 and diodes D11 to D14. An IGBT constitutes a switching element. IGBTs Q11 and Q12 have collectors connected to DC line L1, and emitters connected to input nodes 6a and 6b, respectively. IGBTs Q13 and Q14 have collectors connected to input nodes 6a and 6b, respectively, and emitters connected to DC line L2. Gates of IGBTs Q11 and Q14 receive gate signal Eu, and gates of IGBTs Q12 and Q13 receive gate signal Fu. Diodes D11 to D14 are connected in anti-parallel with IGBTs Q11 to Q14, respectively.

Converter 6 has input node 6a connected to node N1 via reactor 5 (FIG. 1), and input node 6b connected to a neutral point NP. Capacitor 4 is connected between node N1 and neutral point NP.

When gate signals Eu and Fu are at the "H" level and the "L" level, respectively, IGBTs Q11 and Q14 are turned on and IGBTs Q12 and Q13 are turned off. Thereby, input node 6a is connected to the positive-side terminal of capacitor 9

(DC line L1) via IGBT Q11, and the negative-side terminal of capacitor 9 (DC line L2) is connected to input node 6b via IGBT Q14, and thus a positive DC voltage is output to between the terminals of capacitor 9.

When gate signals Eu and Fu are at the "L" level and the "H" level, respectively, IGBTs Q12 and Q13 are turned on and IGBTs Q11 and Q14 are turned off. Thereby, input node 6b is connected to the positive-side terminal of capacitor 9 (DC line L1) via IGBT Q12, and the negative-side terminal of capacitor 9 (DC line L2) is connected to input node 6a via IGBT Q13, and thus a negative DC voltage is output to between the terminals of capacitor 9.

In other words, when the waveforms of gate signals Eu and Fu change as shown in FIGS. 11(B) and (C), an AC voltage Vic having the same waveform as that of voltage command value Vir shown in FIG. 11(A) is output to between node N1 and neutral point NP. A current with a value according to a deviation between AC voltage Vi from commercial AC power supply 21 and AC input voltage Vic from converter 6 flows between commercial AC power supply 21 and converter 6, and voltage VDC between the terminals of capacitor 9 is controlled.

It should be noted that, although FIGS. 11(A), (B), and (C) show the waveforms of voltage command value Vir and signals ϕ72, Eu, and Fu corresponding to the U phase, the same applies to the waveforms of the voltage command value and the signals corresponding to each of the V phase and the W phase. However, the voltage command values and the signals corresponding to the U phase, the V phase, and the W phase are out of phase with respect to each other by 120 degrees.

Next, operation of this uninterruptible power supply device will be described. When output signal ϕ45 of determiner 45 (FIG. 3) is at the "L" level (i.e., in the normal operation mode), reference DC voltage VDCr is set to a rated voltage value by reference voltage generation circuit 61, and converter 6 is PWM-controlled such that DC voltage VDC between DC lines L1 and L2 reaches reference DC voltage VDCr. In addition, inverter 10 is PWM-controlled such that AC output voltage Vo reaches reference AC voltage Vr (FIG. 2).

When output signal ϕ45 of determiner 45 (FIG. 3) is at the "H" level (i.e., in the power saving operation mode), reference DC voltage VDCr is corrected to a value according to deviation ΔVo by reference voltage generation circuit 61, and converter 6 is PWM-controlled such that DC voltage VDC between DC lines L1 and L2 reaches corrected reference DC voltage VDCr. Inverter 10 is controlled based on pulse signal sequence ϕ44 from pattern generator 44, and converts DC voltage VDC with a value according to corrected reference DC voltage VDCr into AC output voltage Vo. In this case, converter 6 and inverter 10 are PAM (Pulse Amplitude Modulation)-controlled such that AC output voltage Vo reaches reference AC voltage Vr (FIG. 2).

As described above, in the fourth embodiment, the same effect as that of the first embodiment is obtained. In addition, since reference DC voltage VDCr is corrected according to AC output voltage deviation ΔVo in the power saving operation mode, AC output voltage Vo can be maintained at the rated voltage.

Fifth Embodiment

Figure 13:
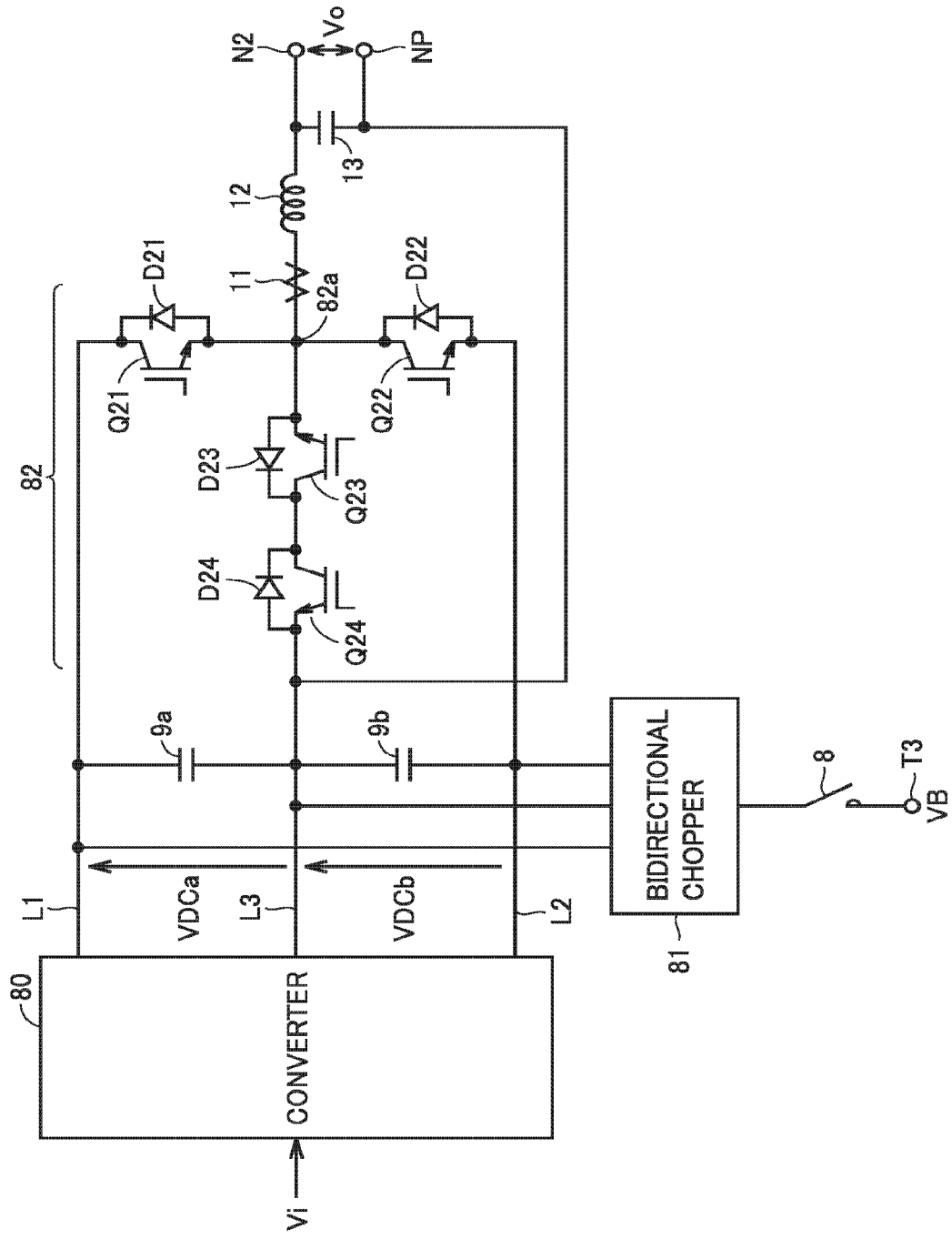
FIG. 13 is a circuit block diagram showing a main part of an uninterruptible power supply device in accordance with a fifth embodiment of the present invention.

FIG. 13 is a circuit block diagram showing a main part of an uninterruptible power supply device in accordance with a fifth embodiment of the present invention, which is compared with FIG. 5. In FIG. 13, this uninterruptible power supply device is different from uninterruptible power supply device 1 in the first embodiment in that a converter 80, a bidirectional chopper 81, and an inverter 82 replace converter 6, bidirectional chopper 7, and inverter 10, respectively.

Three DC lines L1 to L3 are connected between converter 80 and inverter 82. DC line L3 is connected to neutral point NP, and has a neutral point voltage (for example, 0 V). Capacitor 9 (FIG. 1) includes two capacitors 9a and 9b. Capacitor 9a is connected between DC lines L1 and L3. Capacitor 9b is connected between DC lines L3 and L2.

During a normal state in which the AC power is supplied from commercial AC power supply 21, converter 80 converts the AC power from commercial AC power supply 21 into DC power and supplies the DC power to DC lines L1 to L3. On this occasion, converter 80 charges each of capacitors 9a and 9b such that a DC voltage VDCa between DC lines L1 and L3 becomes equal to target DC voltage VDCT and a DC voltage VDCb between DC lines L3 and L2 becomes equal to target DC voltage VDCT.

Voltages in DC lines L1, L2, and L3 are set to a positive DC voltage, a negative DC voltage, and the neutral point voltage, respectively. During a power failure in which the supply of the AC power from commercial AC power supply 21 is stopped, operation of converter 80 is stopped.

During a normal state, bidirectional chopper 81 stores the DC power generated by converter 80 in battery 23 (FIG. 1). On this occasion, bidirectional chopper 81 charges battery 23 such that voltage VB between the terminals of battery 23 becomes equal to target battery voltage VBT.

During a power failure, bidirectional chopper 81 supplies the DC power in battery 23 to inverter 82. On this occasion, bidirectional chopper 81 charges each of capacitors 9a and 9b such that each of voltage VDCa between terminals of capacitor 9a and voltage VDCb between terminals of capacitor 9b becomes equal to target DC voltage VDCT.

During a normal state, inverter 82 converts the DC power generated by converter 80 into AC power having the commercial frequency, and supplies the AC power to load 24 (FIG. 1). On this occasion, inverter 82 generates AC output voltage Vo having the commercial frequency, based on the positive DC voltage, the negative DC voltage, and the neutral point voltage supplied from DC lines L1 to L3.

Inverter 82 includes IGBTs Q21 to Q24 and diodes D21 to D24. IGBT Q21 has a collector connected to DC line L1, and an emitter connected to an output node 82a. IGBT Q22 has a collector connected to output node 82a, and an emitter connected to DC line L2. IGBTs Q23 and Q24 have collectors connected with each other, and emitters connected to output node 82a and DC line L3, respectively. Diodes D21 to D24 are connected in anti-parallel with IGBTs Q21 to Q24, respectively. Output node 82a is connected to node N2 via reactor 12.

When IGBT Q21 is turned on, the positive voltage is output from DC line L1 to output node 82a via IGBT Q21. When IGBTs Q23 and Q24 are turned on, the neutral point voltage is output from DC line L3 to output node 82a via IGBTs Q24 and Q23. When IGBT Q22 is turned on, the negative voltage is output from DC line L2 to output node 82a via IGBT Q22. An AC voltage having three levels including the positive voltage, the neutral point voltage, and the negative voltage is output to output node 82a. A method for controlling IGBTs Q21 to Q24 will be described later.

Figure 14:
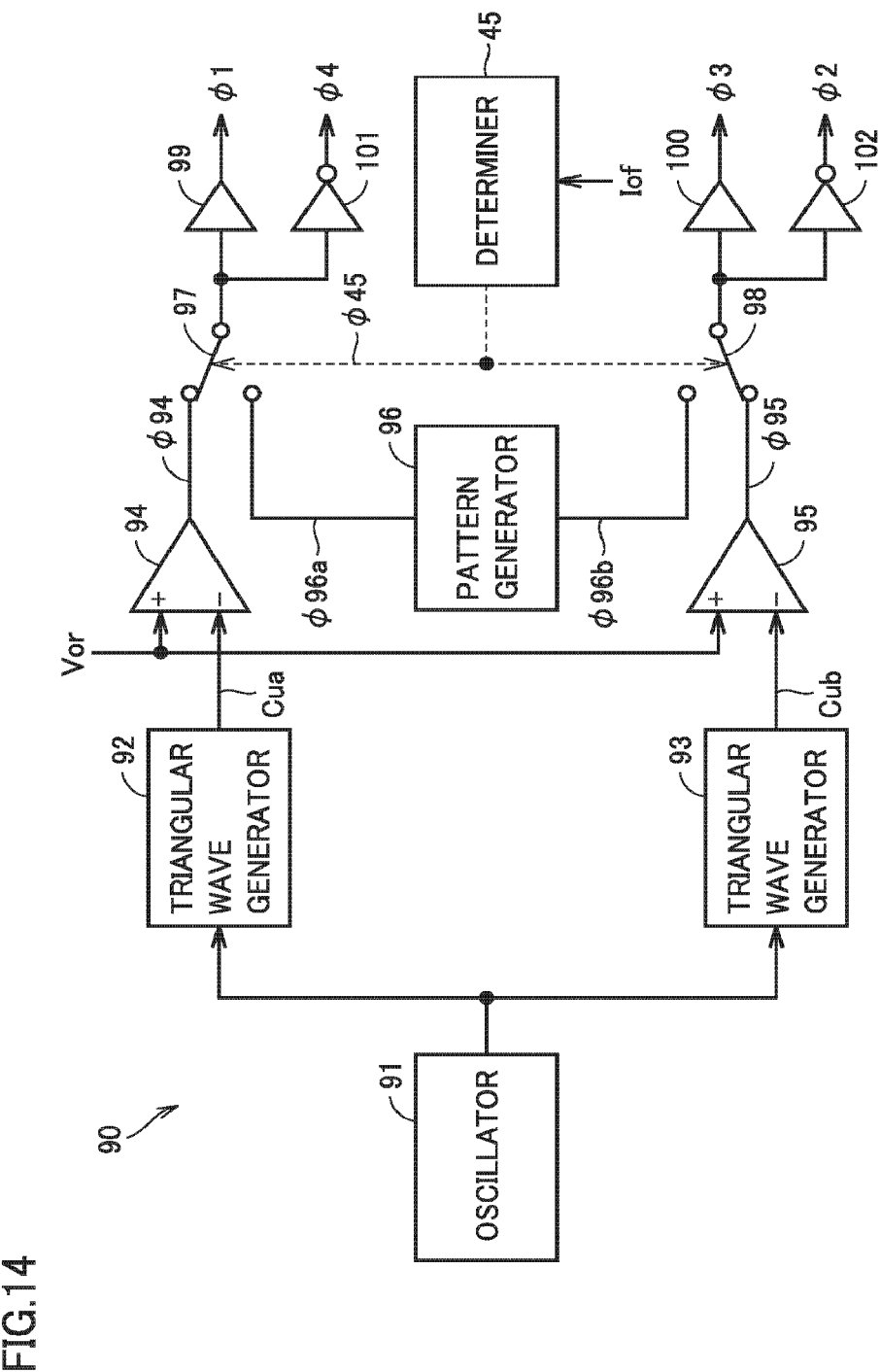
FIG. 14 is a circuit block diagram showing a configuration of a gate control circuit included in the uninterruptible power supply device shown in FIG. 13.

FIG. 14 is a circuit block diagram showing a configuration of a gate control circuit 90 for controlling inverter 82, which is compared with FIG. 3. In FIG. 14, gate control circuit 90 includes an oscillator 91, triangular wave generators 92 and 93, comparators 94 and 95, a pattern generator 96, determiner 45, switches 97 and 98, buffers 99 and 100, and inverters 101 and 102.

Oscillator 91 outputs a clock signal having frequency fH (for example, 20 KHz) fully higher than the commercial frequency (for example, 60 Hz). Triangular wave generators 92 and 93 output triangular wave signals Cua and Cub, respectively, having the same frequency as that of the output clock signal of the oscillator.

Comparator 94 compares levels of voltage command value Vor (a sinusoidal signal having the commercial frequency) from output current control circuit 36 (FIG. 2) and triangular wave signal Cua from triangular wave generator 92, and outputs a pulse signal sequence ϕ94 indicating the result of comparison. The frequency of pulse signal sequence ϕ94 is a frequency with a value according to frequency fH of triangular wave signal Cua. The pulse width of pulse signal sequence ϕ94 changes according to the level of voltage command value Vor. Pulse signal sequence ϕ94 is a PWM signal.

Comparator 95 compares levels of voltage command value Vor (a sinusoidal signal having the commercial frequency) from output current control circuit 36 (FIG. 2) and triangular wave signal Cub from triangular wave generator 93, and outputs a pulse signal sequence ϕ95 indicating the result of comparison. The frequency of pulse signal sequence ϕ95 is a frequency with a value according to frequency fH of triangular wave signal Cub. The pulse width of pulse signal sequence ϕ95 changes according to the level of voltage command value Vor. Pulse signal sequence ϕ95 is a PWM signal.

Pattern generator 96 outputs pulse signal sequences ϕ96a and ϕ96b having frequency fL lower than frequency fH of triangular wave signals Cua and Cub. Waveforms of pulse signal sequences ϕ96a and ϕ96b are similar to waveforms of pulse signal sequences ϕ94 and ϕ95, respectively. The pulse widths of pulse signal sequences ϕ96a and ϕ96b are fixed.

Determiner 45 determines whether or not load current IL is smaller than predetermined value Ic (that is, whether or not load 24 is a light load) based on signal Iof from current detector 11 (FIG. 1), and outputs signal ϕ45 indicating the result of determination. Signal ϕ45 is set to the "L" level when load current IL is larger than predetermined value Ic, and is set to the "H" level when load current IL is smaller than predetermined value Ic.

Switch 97 receives pulse signal sequences ϕ94 and ϕ96a. When signal ϕ45 is at the "L" level (i.e., in the normal operation mode), switch 97 provides pulse signal sequence ϕ94 to buffer 99 and inverter 101, and when signal ϕ45 is at the "H" level (i.e., in the power saving operation mode), switch 97 provides pulse signal sequence ϕ96a to buffer 99 and inverter 101.

Buffer 99 provides pulse signal sequence ϕ94 or ϕ96a from switch 97 to inverter 82, as a gate signal ϕ1. Inverter 101 inverts pulse signal sequence ϕ94 or ϕ96a from switch 97 to generate a gate signal ϕ4 and provides gate signal ϕ4 to inverter 82.

Switch 98 receives pulse signal sequences ϕ95 and ϕ96b. When signal ϕ45 is at the "L" level (i.e., in the normal operation mode), switch 98 provides pulse signal sequence ϕ95 to buffer 100 and inverter 102, and when signal ϕ45 is at the "H" level (i.e., in the power saving operation mode), switch 98 provides pulse signal sequence ϕ96b to buffer 100 and inverter 102.

Buffer 100 provides pulse signal sequence ϕ95 or ϕ96b from switch 98 to inverter 82, as a gate signal ϕ3. Inverter 102 inverts pulse signal sequence ϕ95 or ϕ96b from switch 98 to generate a gate signal ϕ2 and provides gate signal ϕ2 to inverter 82.

Figure 15:
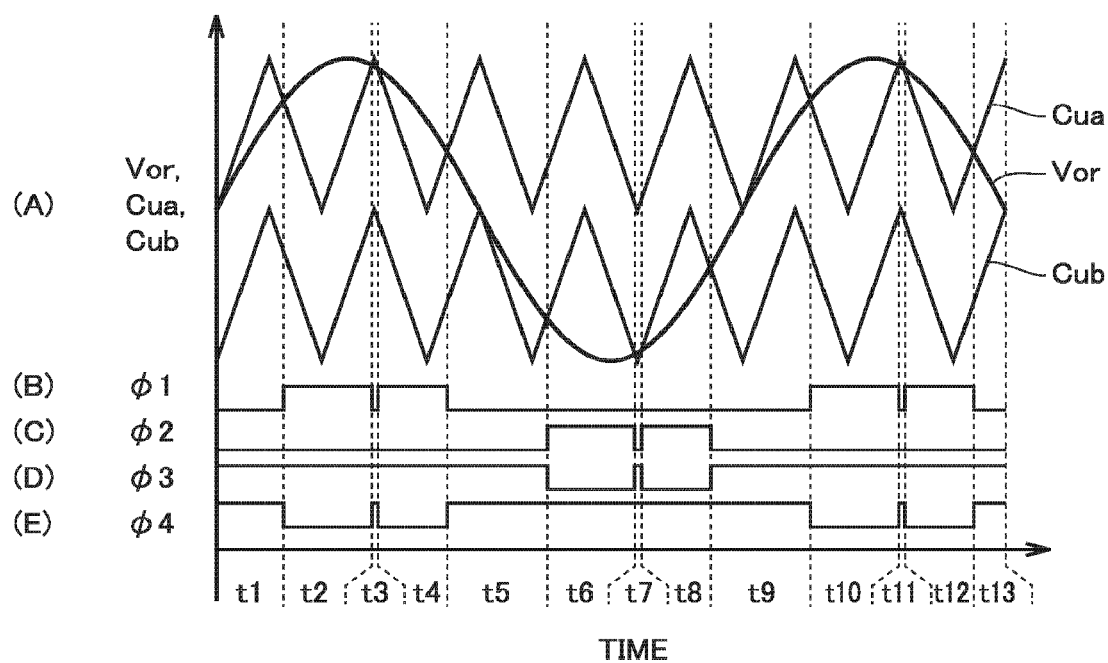
FIG. 15 is a time chart illustrating waveforms of a voltage command value, triangular wave signals, and gate signals shown in FIG. 14.

FIGS. 15(A) to (E) show a time chart showing waveforms of voltage command value Vor, triangular wave signals Cua and Cub, and gate signals ϕ1 to ϕ4 in the normal operation mode. As shown in FIG. 15(A), voltage command value Vor is a sinusoidal signal having the commercial frequency.

Triangular wave signal Cua has a minimum value of 0 V, and a maximum value higher than a positive peak value of voltage command value Vor. Triangular wave signal Cub has a maximum value of 0 V, and a minimum value lower than a negative peak value of voltage command value Vor. Triangular wave signals Cua and Cub are signals having the same phase, and the phase of triangular wave signals Cua and Cub is in synchronization with the phase of voltage command value Vor. The frequency of triangular wave signals Cua and Cub is higher than the frequency (commercial frequency) of voltage command value Vor.

As shown in FIGS. 15(A) and (B), when the level of triangular wave signal Cua is higher than the level of voltage command value Vor, gate signal ϕ1 is at an "L" level, and when the level of triangular wave signal Cua is lower than the level of voltage command value Vor, gate signal ϕ1 is at an "H" level. Gate signal ϕ1 is a positive pulse signal sequence.

During a period in which voltage command value Vor has positive polarity, the pulse width of gate signal ϕ1 increases as voltage command value Vor increases. During a period in which voltage command value Vor has negative polarity, gate signal ϕ1 is fixed to the "L" level. As shown in FIGS. 15(B) and (E), gate signal ϕ4 is an inverted signal of gate signal ϕ1.

As shown in FIGS. 15(A) and (C), when the level of triangular wave signal Cub is lower than the level of voltage command value Vor, gate signal ϕ2 is at an "L" level, and when the level of triangular wave signal Cub is higher than the level of voltage command value Vor, gate signal ϕ2 is at an "H" level. Gate signal ϕ2 is a positive pulse signal sequence.

During the period in which voltage command value Vor has positive polarity, gate signal ϕ2 is fixed to the "L" level. During the period in which voltage command value Vor has negative polarity, the pulse width of gate signal ϕ2 increases as voltage command value Vor decreases. As shown in FIGS. 15(C) and (D), gate signal ϕ3 is an inverted signal of gate signal ϕ2. Each of gate signals ϕ1 to ϕ4 is a PWM signal.

During periods in which gate signals ϕ1 and ϕ2 are at the "L" level and gate signals ϕ3 and ϕ4 are at the "H" level (t1, t3, t5, t7, t9, . . . ), IGBTs Q21 and Q22 are turned off and IGBTs Q23 and Q24 are turned on. Thereby, the neutral point voltage in DC line L3 is output to output node 82a via IGBTs Q24 and Q23.

During periods in which gate signals ϕ1 and ϕ3 are at the "H" level and gate signals ϕ2 and ϕ4 are at the "L" level (t2, t4, . . . ), IGBTs Q21 and Q23 are turned on and IGBTs Q22 and Q24 are turned off. Thereby, the positive DC voltage in DC line L1 is output to output node 82a via IGBT Q21.

During periods in which gate signals ϕ1 and ϕ3 are at the "L" level and gate signals ϕ2 and ϕ4 are at the "H" level (t6, t8, . . . ), IGBTs Q21 and Q23 are turned off and IGBTs Q22 and Q24 are turned on. Thereby, the negative DC voltage in DC line L2 is output to output node 82a via IGBT Q22.

When the waveforms of gate signals ϕ1 to ϕ4 change as shown in FIGS. 15(B) to (E), AC output voltage Vo having the same waveform as that of voltage command value Vor shown in FIG. 15(A) is output to between node N2 and neutral point NP. It should be noted that, although FIGS. 15(A) to (E) show the waveforms of voltage command value Vor and signals Cua, Cub, and φ1 to φ4 corresponding to the U phase, the same applies to the waveforms of the voltage command value and the signals corresponding to each of the V phase and the W phase. However, the voltage command values and the signals corresponding to the U phase, the V phase, and the W phase are out of phase with respect to each other by 120 degrees.

Waveforms of gate signals φ1 to φ4 during the power saving operation mode are similar to the waveforms of gate signals φ1 to φ4 during the normal operation mode. However, frequency fL of gate signals φ1 to φ4 during the power saving operation mode is lower than frequency fH of gate signals φ1 to φ4 during the normal operation mode. In addition, the pulse widths of gate signals φ1 to φ4 during the normal operation mode are controlled, whereas the pulse widths of gate signals φ1 to φ4 during the power saving operation mode are fixed.

As can be seen from FIGS. 15(A) to (E), when the frequency of triangular wave signals Cua and Cub is increased, the frequency of gate signals φ1 to φ4 increases, and the switching frequency of IGBTs Q21 to Q24 (the number of times of turning on and off per second) increases. When the switching frequency of IGBTs Q21 to Q24 increases, switching losses occurring in IGBTs Q21 to Q24 increase, causing a reduction in the efficiency of the uninterruptible power supply device. However, when the switching frequency of IGBTs Q21 to Q24 is increased, high-quality AC output voltage Vo having a small voltage fluctuation rate can be generated even in a case where load current IL is large.

In contrast, when the frequency of triangular wave signals Cua and Cub is decreased, the frequency of gate signals φ1 to φ4 decreases, and the switching frequency of IGBTs Q21 to Q24 decreases. When the switching frequency of IGBTs Q21 to Q24 decreases, switching losses occurring in IGBTs Q21 to Q24 decrease, achieving an improved efficiency of the uninterruptible power supply device. However, when the switching frequency of IGBTs Q21 to Q24 is decreased, the voltage fluctuation rate of AC output voltage Vo increases and the waveform of AC output voltage Vo is deteriorated in the case where load current IL is large.

However, in a case where load current IL is small, even when the switching frequency of IGBTs Q21 to Q24 is decreased, change of the voltage fluctuation rate of AC output voltage Vo is small, and the degree of deterioration of the waveform of AC output voltage Vo is small. In addition, when the switching frequency of IGBTs Q21 to Q24 is decreased, switching losses occurring in IGBTs Q21 to Q24 can be decreased, achieving an improved efficiency of the uninterruptible power supply device. Further, in the case where load current IL is small, a change amount per unit time of load current IL is also small, and thus it is not necessary to perform PWM control.

Accordingly, in the fifth embodiment, there are provided the normal operation mode in which inverter 82 is controlled by gate signals φ1 to φ4 having relatively high frequency fH and having controlled pulse widths, and the power saving operation mode in which inverter 82 is controlled by gate signals φ1 to φ4 having relatively low frequency fL and having fixed pulse widths to decrease switching losses, as in the first embodiment. When load current IL is larger than predetermined value Ic, the normal operation mode is selected, and when load current IL is smaller than predetermined value Ic, the power saving operation mode is selected.

Next, a method of using the uninterruptible power supply device and operation thereof will be described. It is assumed that the user of uninterruptible power supply device 1 operates operation unit 17 to select the inverter power feeding mode. In gate control circuit 90 (FIG. 14), triangular wave signals Cua and Cub having relatively high frequency fH are generated by oscillator 91 and triangular wave generators 92 and 93.

Voltage command value Vor is compared with triangular wave signal Cua by comparator 94, and pulse signal sequence φ94 is generated. In pattern generator 96, pulse signal sequence φ96a is generated. Pulse signal sequence φ94 or φ96a selected by switch 97 is provided to buffer 99 and inverter 101, and gate signals φ1 and φ4 are generated.

In addition, voltage command value Vor is compared with triangular wave signal Cub by comparator 95, and pulse signal sequence φ95 is generated. In pattern generator 96, pulse signal sequence φ96b is generated. Pulse signal sequence φ95 or φ96b selected by switch 98 is provided to buffer 100 and inverter 102, and gate signals φ3 and φ2 are generated.

During the period in which voltage command value Vor has positive polarity, IGBTs Q22 and Q23 of inverter 82 (FIG. 13) are fixed to an OFF state and an ON state, respectively, and IGBT Q21 and IGBT Q24 are alternately turned on. During the period in which voltage command value Vor has negative polarity, IGBTs Q21 and Q24 are fixed to an OFF state and an ON state, respectively, and IGBT Q22 and IGBT Q23 are alternately turned on by gate signals φ2 and φ3, generating AC output voltage Vo having three levels.

When load 24 is driven by AC output voltage Vo, in determiner 45 (FIG. 14), it is determined whether or not load current IL is larger than predetermined value Ic, based on output signal Iof of current detector 11.

When load current IL is larger than predetermined value Ic, output signal φ45 of determiner 45 is set to the "L" level. Thereby, output signal φ94 of comparator 94 is provided to buffer 99 and inverter 101 via switch 97, and output signal φ95 of comparator 95 is provided to buffer 100 and inverter 102 via switch 98. Thus, the normal operation mode is performed.

Since IGBTs Q21 to Q24 of inverter 82 are controlled at relatively high frequency fH in the normal operation mode, high-quality AC output voltage Vo having a relatively small voltage fluctuation rate can be generated. However, relatively large switching losses occur in IGBTs Q21 to Q24, causing a reduction in the efficiency of the uninterruptible power supply device.

In addition, when load current IL is smaller than predetermined value Ic (that is, when load 24 is a light load), output signal φ45 of determiner 45 (FIG. 14) is set to the "H" level. Thereby, pulse signal sequence φ96a generated in pattern generator 96 is provided to buffer 99 and inverter 101 via switch 97, and pulse signal sequence φ96b generated in pattern generator 96 is provided to buffer 100 and inverter 102 via switch 98. Thus, the power saving operation mode is performed.

Since IGBTs Q21 to Q24 of inverter 82 are controlled at relatively low frequency fL in the power saving operation mode, switching losses occurring in IGBTs Q21 to Q24 decrease, achieving an improved efficiency. Since other configuration and operation are the same as those in the first embodiment, the description thereof will not be repeated.

As described above, in the fifth embodiment, when load current IL is larger than predetermined value Ic, inverter 82 is controlled by gate signals φ1 to φ4 having relatively high frequency fH and having controlled pulse widths, and when load current IL is smaller than predetermined value Ic, inverter 82 is controlled by gate signals φ1 to φ4 having relatively low frequency fL and having fixed pulse widths. Therefore, when load current IL is smaller than predetermined value Ic, switching losses occurring in IGBTs Q21 to Q24 of inverter 82 can be decreased, achieving an improved efficiency of uninterruptible power supply device 1.

It should be understood that the embodiments disclosed herein are illustrative and non-restrictive in every respect. The present invention is defined by the scope of the claims, rather than the description above, and is intended to include any modifications within the scope and meaning equivalent to the scope of the claims.

REFERENCE SIGNS LIST

1: uninterruptible power supply device; T1: AC input terminal; T2: bypass input terminal; T3: battery terminal; T4: AC output terminal; 2, 8, 14, 16: electromagnetic contactor; 3, 11: current detector; 4, 9, 9a, 9b, 13: capacitor; 5, 12: reactor; 6, 80: converter; 7, 81: bidirectional chopper; 10, 48, 82, 101, 102: inverter; 15: semiconductor switch; 17: operation unit; 18, 60: control device; 21: commercial AC power supply; 22: bypass AC power supply; 23: battery; 24: load; 31, 61: reference voltage generation circuit; 32, 62: voltage detector; 33, 35, 63, 65: subtractor; 34, 64: output voltage control circuit; 36, 66: output current control circuit; 37, 50, 55, 56, 70, 90: gate control circuit; 41, 71, 91: oscillator; 42, 72, 92, 93: triangular wave generator; 43, 73, 94, 95: comparator; 44, 96: pattern generator; 45, 51: determiner; 46, 97, 98: switch; 47, 74, 99, 100: buffer; 57: OR gate.

The invention claimed is:

1. A power conversion device comprising:
an inversion unit including a plurality of first switching elements and configured to convert DC power into AC power having a commercial frequency and supply the AC power to a load;
a conversion unit including a plurality of second switching elements and configured to convert AC power supplied from a commercial AC power supply into DC power and provide the DC power to the inversion unit;
a first controller configured to perform a mode selected from a first mode and a second mode, the first mode being a mode in which a first pulse signal sequence is generated, the first pulse signal sequence having a first frequency higher than the commercial frequency and having a pulse width controlled based on an AC output voltage of the inversion unit, the second mode being a mode in which a second pulse signal sequence is generated, the second pulse signal sequence having a second frequency between the commercial frequency and the first frequency and having a fixed pulse width; and
a second controller configured to generate a third pulse signal sequence, the third pulse signal sequence having a third frequency higher than the commercial frequency and having a controlled pulse width,
the plurality of first switching elements being controlled based on the first pulse signal sequence during the first mode; and controlled based on the second pulse signal sequence during the second mode,
the plurality of second switching elements being controlled based on the third pulse signal sequence;

a pulse width of the first pulse signal sequence being controlled such that the AC output voltage of the inversion unit reaches a reference AC voltage, and
the second controller including
a voltage generation circuit configured to output a constant reference DC voltage during the first mode, and output a reference DC voltage with a value according to a deviation between the AC output voltage of the inversion unit and the reference AC voltage, and
a signal generation circuit configured to generate the third pulse signal sequence, a pulse width of the third pulse signal sequence being controlled such that an output DC voltage of the conversion unit reaches the reference DC voltage.

2. The power conversion device according to claim 1, wherein
the first mode is selected when normal operation of the power conversion device is performed, and
the second mode is selected when a load current is smaller than a first value or when a change amount per unit time of the load current is smaller than a second value, to reduce switching losses occurring in the plurality of first switching elements.

3. The power conversion device according to claim 2, further comprising:
a current detector configured to detect the load current; and
a selection unit configured to operate based on a result of detection by the current detector, select the first mode when the load current is larger than the first value, and select the second mode when the load current is smaller than the first value.

4. The power conversion device according to claim 2, further comprising:
a current detector configured to detect the load current; and
a selection unit configured to operate based on a result of detection by the current detector, select the first mode when the change amount per unit time of the load current is larger than the second value, and select the second mode when the change amount per unit time of the load current is smaller than the second value.

5. The power conversion device according to claim 2, further comprising a selection unit configured to select a desired mode from the first and second modes.

6. The power conversion device according to claim 1, wherein
the first controller includes
a first signal generation circuit configured to compare levels of a sinusoidal signal having the commercial frequency and a triangular wave signal having a frequency with a value according to the first frequency, and generate the first pulse signal sequence based on a result of comparison,
a second signal generation circuit configured to generate the second pulse signal sequence, and
a switching circuit configured to select the first pulse signal sequence during the first mode, and select the second pulse signal sequence during the second mode.

7. The power conversion device according to claim 1, wherein
during a normal state in which the AC power is supplied from the commercial AC power supply, the DC power generated by the conversion unit is supplied to the inversion unit and is also stored in a power storage device, and during a power failure in which supply of the AC power from the commercial AC power supply is stopped, the DC power in the power storage device is supplied to the inversion unit.

* * * * *